(12) United States Patent
Moreno Noguer et al.

(10) Patent No.: US 12,377,549 B2
(45) Date of Patent: Aug. 5, 2025

(54) SYSTEM AND METHOD FOR DETERMINING A GRASPING HAND MODEL

(71) Applicants: Naver Corporation, Seongnam-si (KR); Naver Labs Corporation, Seongnam-si (KR)

(72) Inventors: Francesc Moreno Noguer, Barcelona (ES); Guillem Alenyà Ribas, Barcelona (ES); Enric Corona Puyane, Barcelona (ES); Albert Pumarola Peris, Barcelona (ES); Grégory Rogez, Meylan (FR)

(73) Assignee: NAVER Corporation, Gyeonggi-do (KR)

( * ) Notice: Subject to any disclaimer, the term of this patent is extended or adjusted under 35 U.S.C. 154(b) by 435 days.

(21) Appl. No.: 17/833,460

(22) Filed: Jun. 6, 2022

(65) Prior Publication Data

US 2022/0402125 A1    Dec. 22, 2022

Related U.S. Application Data

(63) Continuation-in-part of application No. 17/341,970, filed on Jun. 8, 2021, now abandoned.
(Continued)

(30) Foreign Application Priority Data

Jun. 9, 2020   (ES) .................................. 202030553

(51) Int. Cl.
B25J 9/16    (2006.01)
(52) U.S. Cl.
CPC ............. B25J 9/1697 (2013.01); B25J 9/161 (2013.01)

(58) Field of Classification Search
CPC ........ B25J 9/1697; B25J 9/161; B25J 9/1612; G05B 2219/39536; G05B 2219/39546;
(Continued)

(56) References Cited

U.S. PATENT DOCUMENTS 10,099,369 B2 *  10/2018  Kopicki ................... B25J 9/163
11,341,406 B1 *   5/2022  Redmon ................ B25J 9/1697
(Continued)

OTHER PUBLICATIONS

Li, Xueting, Sifei Liu, Kihwan Kim, Xiaolong Wang, Ming-Hsuan Yang, and Jan Kautz. "Putting Humans in a Scene: Learning Affordance in 3D Indoor Environments." In 2019 IEEE/CVF Conference on Computer Vision and Pattern Recognition (CVPR), 12360-68. Long Beach, CA, USA: IEEE, 2019.
(Continued)

*Primary Examiner* — Stephen R Koziol
*Assistant Examiner* — Michael Kim Maiden
(74) *Attorney, Agent, or Firm* — Michael J. Nickerson

(57) ABSTRACT

Method for determining a grasping hand model suitable for grasping an object by receiving an image including at least one object; obtaining an object model estimating a pose and shape of the object from the image of the object; selecting a grasp class from a set of grasp classes by means of a neural network, with a cross entropy loss, thus, obtaining a set of parameters defining a coarse grasping hand model; refining the coarse grasping hand model, by minimizing loss functions referring to the parameters of the hand model for obtaining an operable grasping hand model while minimizing the distance between the finger of the hand model and the surface of the object and preventing interpenetration; and obtaining a mesh of the hand represented by the enhanced set of parameters.

40 Claims, 11 Drawing Sheets

Related U.S. Application Data

(60) Provisional application No. 63/208,231, filed on Jun. 8, 2021.

(58) Field of Classification Search
CPC .... G06V 10/82; G06N 3/0464; G06T 3/4046; G06T 5/60
See application file for complete search history.

(56) References Cited

U.S. PATENT DOCUMENTS

| | | | |
|---|---|---|---|
| 2014/0016856 A1* | 1/2014 | Jiang | G06T 7/11 |
| | | | 382/153 |
| 2020/0086483 A1* | 3/2020 | Li | B25J 9/1653 |
| 2021/0122045 A1* | 4/2021 | Handa | B25J 13/084 |

OTHER PUBLICATIONS

Lin, Yun, and Yu Sun. "Grasp Planning Based on Strategy Extracted from Demonstration." In 2014 IEEE/RSJ International Conference on Intelligent Robots and Systems, 4458-63. Chicago, IL, USA: IEEE, 2014.

Liu, Jia, Fangxiaoyu Feng, Yuzuko C. Nakamura, and Nancy S. Pollard. "A Taxonomy of Everyday Grasps in Action." In 2014 IEEE-RAS International Conference on Humanoid Robots, 573-80. Madrid, Spain: IEEE, 2014.

Lopes, Manuel, Francisco Melo, Luis Montesano, and José Santos-Victor. "Abstraction Levels for Robotic Imitation: Overview and Computational Approaches." In From Motor Learning to Interaction Learning in Robots, edited by Olivier Sigaud and Jan Peters, 264:313-55. Studies in Computational Intelligence. Berlin, Heidelberg: Springer Berlin Heidelberg, 2010.

Madadi, Meysam, Sergio Escalera, Xavier Baro, and Jordi Gonzalez. "End-to-End Global to Local CNN Learning for Hand Pose Recovery in Depth Data." arXiv, Apr. 11, 2018.

Mahler, Jeffrey, Jacky Liang, Sherdil Niyaz, Michael Laskey, Richard Doan, Xinyu Liu, Juan Aparicio Ojea, and Ken Goldberg. "Dex-Net 2.0: Deep Learning to Plan Robust Grasps with Synthetic Point Clouds and Analytic Grasp Metrics." arXiv, Aug. 8, 20.

Miller, Andrew and Allen, Peter—Graspit! A versatile simulator for robotic grasping. 2004.

Minjie Cai, Kris M. Kitani, and Yoichi Sato. "A Scalable Approach for Understanding the Visual Structures of Hand Grasps." In 2015 IEEE International Conference on Robotics and Automation (ICRA), 1360-66. Seattle, WA, USA: IEEE, 2015.

Morrison, Douglas, Peter Corke, and Jürgen Leitner. "Closing the Loop for Robotic Grasping: A Real-Time, Generative Grasp Synthesis Approach." arXiv, May 15, 2018.

Mousavian, Arsalan, Clemens Eppner, and Dieter Fox. "6-DOF GraspNet: Variational Grasp Generation for Object Manipulation." In 2019 IEEE/CVF International Conference on Computer Vision (ICCV), 2901-10. Seoul, Korea (South): IEEE, 2019.

Mueller, Franziska, Florian Bernard, Oleksandr Sotnychenko, Dushyant Mehta, Srinath Sridhar, Dan Casas, and Christian Theobalt. "GANerated Hands for Real-Time 3D Hand Tracking from Monocular RGB." In 2018 IEEE/CVF Conference on Computer Vision and Pattern Recognition, 49-59. Salt Lake City, UT: IEEE, 2018.

Myronenko, Andriy, and Xubo Song. "Point-Set Registration: Coherent Point Drift." arXiv, May 15, 2009.

Oberweger, Markus, and Vincent Lepetit. "DeepPrior++: Improving Fast and Accurate 3D Hand Pose Estimation." In 2017 IEEE International Conference on Computer Vision Workshops (ICCVW), 585-94. Venice: IEEE, 2017.

Oberweger, Markus, Paul Wohlhart, and Vincent Lepetit. "Generalized Feedback Loop for Joint Hand-Object Pose Estimation." arXiv, Mar. 25, 2019.

Oikonomidis, Iason, Nikolaos Kyriazis, and Antonis A. Argyros. "Full DOF Tracking of a Hand Interacting with an Object by Modeling Occlusions and Physical Constraints." In 2011 International Conference on Computer Vision, 2088-95. Barcelona, Spain: IEEE, 2011.

Panteleris, Paschalis, and Antonis Argyros. "Back to RGB: 3D Tracking of Hands and Hand-Object Interactions Based on Short-Baseline Stereo." In 2017 IEEE International Conference on Computer Vision Workshops (ICCVW), 575-84. Venice, Italy: IEEE, 2017.

Panteleris, Paschalis, Iason Oikonomidis, and Antonis Argyros. "Using a Single RGB Frame for Real Time 3D Hand Pose Estimation in the Wild." In 2018 IEEE Winter Conference on Applications of Computer Vision (WACV), 436-45. Lake Tahoe, NV: IEEE, 2018.

Pas, Andreas ten, Marcus Gualtieri, Kate Saenko, and Robert Platt. "Grasp Pose Detection in Point Clouds." arXiv, Jun. 29, 20.

Pham, Tu-Hoa, Nikolaos Kyriazis, Antonis A. Argyros, and Abderrahmane Kheddar. "Hand-Object Contact Force Estimation from Markerless Visual Tracking." IEEE Transactions on Pattern Analysis and Machine Intelligence 40, No. 12, 2018.

Pinto, Lerrel, and Abhinav Gupta. "Supersizing Self-Supervision: Learning to Grasp from 50K Tries and 700 Robot Hours." In 2016 IEEE International Conference on Robotics and Automation (ICRA), 3406-13. Stockholm, Sweden: IEEE, 2016.

Porzi, Lorenzo et al.—Learning Depth-Aware Deep representations for robotic perception. IEEE Robotics and Automation Letters, 2016.

Pumarola, Albert, Jordi Sanchez, Gary P. T. Choi, Alberto Sanfeliu, and Francesc Moreno. "3DPeople: Modeling the Geometry of Dressed Humans." In 2019 IEEE/CVF International Conference on Computer Vision (ICCV), 2242-51. Seoul, Korea (South): IEEE, 2019.

Qian, Chen, Xiao Sun, Yichen Wei, Xiaoou Tang, and Jian Sun. "Realtime and Robust Hand Tracking from Depth." In 2014 IEEE Conference on Computer Vision and Pattern Recognition, 1106-13. Columbus, OH, USA: IEEE, 2014.

Rad, Mahdi, Markus Oberweger, and Vincent Lepetit. "Domain Transfer for 3D Pose Estimation from Color Images without Manual Annotations." arXiv, Feb. 21, 2019.

Redmon, Joseph, and Anelia Angelova. "Real-Time Grasp Detection Using Convolutional Neural Networks." In 2015 IEEE International Conference on Robotics and Automation (ICRA), 1316-22. Seattle, WA, USA: IEEE, 2015.

Rock, Jason, Tanmay Gupta, Justin Thorsen, JunYoung Gwak, Daeyun Shin, and Derek Hoiem. "Completing 3D Object Shape from One Depth Image." In 2015 IEEE Conference on Computer Vision and Pattern Recognition (CVPR), 2484-93. Boston, MA, USA: IEEE, 2015.

Rogez, Gregory, James S. Supancic, and Deva Ramanan. "First-Person Pose Recognition Using Egocentric Workspaces." In 2015 IEEE Conference on Computer Vision and Pattern Recognition (CVPR), 4325-33. Boston, MA, USA: IEEE, 2015.

Rogez, Gregory, James S. Supancic, and Deva Ramanan. "Understanding Everyday Hands in Action from RGB-D Images." In 2015 IEEE International Conference on Computer Vision (ICCV), 3889-97. Santiago: IEEE, 2015.

Romero, Javier, Hedvig Kjellstrom, and Danica Kragic. "Hands in Action: Real-Time 3D Reconstruction of Hands in Interaction with Objects." In 2010 IEEE International Conference on Robotics and Automation, 458-63. Anchorage, AK: IEEE, 2010.

Romero, Javier, Dimitrios Tzionas, and Michael J. Black. "Embodied Hands: Modeling and Capturing Hands and Bodies Together." ACM Transactions on Graphics 36, No. 6—Nov. 20, 2017.

Roy, Anirban, and Sinisa Todorovic. "A Multi-Scale CNN for Affordance Segmentation in RGB Images." In Computer Vision—ECCV 2016, edited by Bastian Leibe, Jiri Matas, Nicu Sebe, and Max Welling, 9908:186-201. Lecture Notes in Computer Science. Cham: Springer International Publishing, 2016.

Saran, Akanksha, Damien Teney, and Kris M. Kitani. "Hand Parsing for Fine-Grained Recognition of Human Grasps in Monocular Images." In 2015 IEEE/RSJ International Conference on Intelligent Robots and Systems (IROS), 5052-58. Hamburg, Germany: IEEE, 2015.

(56) References Cited

OTHER PUBLICATIONS

Saudabayev, Artur, Zhanibek Rysbek, Raykhan Khassenova, and Huseyin Atakan Varol. "Human Grasping Database for Activities of Daily Living with Depth, Color and Kinematic Data Streams." Scientific Data 5, No. 1. 2018.
Schmidt, Philipp, Nikolaus Vahrenkamp, Mirko Wachter, and Tamim Asfour. "Grasping of Unknown Objects Using Deep Convolutional Neural Networks Based on Depth Images." In 2018 IEEE International Conference on Robotics and Automation (ICRA), 6831-38. Brisbane, QLD: IEEE, 2018.
Spurr, Adrian, Jie Song, Seonwook Park, and Otmar Hilliges. "Cross-Modal Deep Variational Hand Pose Estimation." In 2018 IEEE/CVF Conference on Computer Vision and Pattern Recognition, 89-98. Salt Lake City, UT: IEEE, 2018.
Sridhar, Srinath, Franziska Mueller, Michael Zollhofer, Dan Casas, Antti Oulasvirta, and Christian Theobalt. "Real-Time Joint Tracking of a Hand Manipulating an Object from RGB-D Input." In Computer Vision—ECCV 2016, edited by Bastian Leibe, Jiri Matas, Nicu Sebe, and Max Welling, 9906:294-310. Lecture Notes in Computer Science. Cham: Springer International Publishing, 2016.
Sun, Xiao, Yichen Wei, Shuang Liang, Xiaoou Tang, and Jian Sun. "Cascaded Hand Pose Regression," CVPR, 2015.
Sundermeyer, Martin, Zoltan-Csaba Marton, Maximilian Durner, Manuel Brucker, and Rudolph Triebel. "Implicit 3D Orientation Learning for 6D Object Detection from RGB Images." In Computer Vision—ECCV 2018, edited by Vittorio Ferrari, Martial Hebert, Cristian Sminchisescu, and Yair Weiss, 11210:712-29. Lecture Notes in Computer Science. Cham: Springer International Publishing, 2018.
Supancic, James S., Gregory Rogez, Yi Yang, Jamie Shotton, and Deva Ramanan. "Depth-Based Hand Pose Estimation: Data, Methods, and Challenges." In 2015 IEEE International Conference on Computer Vision (ICCV), 1868-76. Santiago: IEEE, 2015.
Tekin, Bugra, Federica Bogo, and Marc Pollefeys. "H+O: Unified Egocentric Recognition of 3D Hand-Object Poses and Interactions." In 2019 IEEE/CVF Conference on Computer Vision and Pattern Recognition (CVPR), 4506-15. Long Beach, CA, USA: IEEE, 2019.
Thayananthan, A., B. Stenger, P.H.S. Torr, and R. Cipolla. "Shape Context and Chamfer Matching in Cluttered Scenes." In 2003 IEEE Computer Society Conference on Computer Vision and Pattern Recognition, 2003. Proceedings., I-127-I-133. Madison, WI, USA: IEEE Comput. Soc, 2003.
Tsoli, Aggeliki, and Antonis A. Argyros. "Joint 3D Tracking of a Deformable Object in Interaction with a Hand." In Computer Vision—ECCV 2018, edited by Vittorio Ferrari, Martial Hebert, Cristian Sminchisescu, and Yair Weiss, 11218:504-20. Lecture Notes in Computer Science. Cham: Springer International Publishing, 2018.
Tzionas, Dimitrios, Luca Ballan, Abhilash Srikantha, Pablo Aponte, Marc Pollefeys, and Juergen Gall. "Capturing Hands in Action Using Discriminative Salient Points and Physics Simulation." International Journal of Computer Vision 118, No. 2—Jun. 2016.
Tzionas, Dimitrios, and Juergen Gall. "3D Object Reconstruction from Hand-Object Interactions." In 2015 IEEE International Conference on Computer Vision (ICCV), 729-37. Santiago, Chile: IEEE, 2015.
Wang, Xiaolong, Rohit Girdhar, and Abhinav Gupta. "Binge Watching: Scaling Affordance Learning from Sitcoms." In 2017 IEEE Conference on Computer Vision and Pattern Recognition (CVPR), 3366-75. Honolulu, HI: IEEE, 2017.
Wang, Yangang, Jianyuan Min, Jianjie Zhang, Yebin Liu, Feng Xu, Qionghai Dai, and Jinxiang Chai. "Video-Based Hand Manipulation Capture through Composite Motion Control." ACM Transactions on Graphics 32, No. 4—Jul. 21, 2013.
Wang, Yiwei, Xin Ye, Yezhou Yang, and Wenlong Zhang. "Hand Movement Prediction Based Collision-Free Human-Robot Interaction." In 2017 IEEE Conference on Computer Vision and Pattern Recognition Workshops (CVPRW), 492-93. Honolulu, HI, USA: IEEE, 2017.
Xiang, Yu, Tanner Schmidt, Venkatraman Narayanan, and Dieter Fox. "PoseCNN: A Convolutional Neural Network for 6D Object Pose Estimation in Cluttered Scenes." In Robotics: Science and Systems XIV. Robotics: Science and Systems Foundation, 2018.
Yuan, Shanxin, Guillermo Garcia-Hernando, Bjorn Stenger, Gyeongsik Moon, Ju Yong Chang, Kyoung Mu Lee, Pavlo Molchanov, et al. "Depth-Based 3D Hand Pose Estimation: From Current Achievements to Future Goals." In 2018 IEEE/CVF Conference on Computer Vision and Pattern Recognition, 2636-45. Salt Lake City, UT, USA: IEEE, 2018.
Yuan, Shanxin, Qi Ye, Bjorn Stenger, Siddhant Jain, and Tae-Kyun Kim. "BigHand2.2M Benchmark: Hand Pose Dataset and State of the Art Analysis." In 2017 IEEE Conference on Computer Vision and Pattern Recognition (CVPR), 2605-13. Honolulu, HI: IEEE, 2017.
Zimmermann, Christian, and Thomas Brox. "Learning to Estimate 3D Hand Pose from Single RGB Images." In 2017 International Conference on Computer Vision (ICCV), 4913-21. Venice: IEEE, 2017.
Arjovsky, Martin, Soumith Chintala, and Léon Bottou. "Wasserstein GAN." arXiv, Dec. 6, 2017.
Baek, Seungryul, Kwang In Kim, and Tae-Kyun Kim. "Pushing the Envelope for RGB-Based Dense 3D Hand Pose Estimation via Neural Rendering." arXiv, Apr. 9, 2019.
Balasubramanian, Ravi, Ling Xu, Peter D. Brook, Joshua R. Smith, and Yoky Matsuoka. "Physical Human Interactive Guidance: Identifying Grasping Principles From Human-Planned Grasps." IEEE Transactions on Robotics 28, No. 4. 2012.
Ballan, Luca, Aparna Taneja, Jürgen Gall, Luc Van Gool, and Marc Pollefeys. "Motion Capture of Hands in Action Using Discriminative Salient Points." In Computer Vision—ECCV 2012, edited by Andrew Fitzgibbon, Svetlana Lazebnik, Pietro Perona, Yoichi Sato, and Cordelia Schmid, 7577:640-53. Lecture Notes in Computer Science. Berlin, Heidelberg: Springer Berlin Heidelberg, 2012.
Bambach, Sven, Stefan Lee, David J. Crandall, and Chen Yu. "Lending A Hand: Detecting Hands and Recognizing Activities in Complex Egocentric Interactions." In 2015 IEEE International Conference on Computer Vision (ICCV), 1949-57. Santiago, Chile: IEEE, 2015.
Borras, Júlia, Guillem Alenya, and Carme Torras. "A Grasping-Centered Analysis for Cloth Manipulation." arXiv, Apr. 9, 2020.
Boukhayma, Adnane, Rodrigo de Bem, and Philip H.S. Torr. "3D Hand Shape and Pose From Images in the Wild." In 2019 IEEE/CVF Conference on Computer Vision and Pattern Recognition (CVPR), 10835-44. Long Beach, CA, USA: IEEE, 2019.
Brahmbhatt, Samarth, Cusuh Ham, Charles C. Kemp, and James Hays. "ContactDB: Analyzing and Predicting Grasp Contact via Thermal Imaging." arXiv, Apr. 14, 2019.
Bullock, Ian M., Thomas Feix, and Aaron M. Dollar. "The Yale Human Grasping Dataset: Grasp, Object, and Task Data in Household and Machine Shop Environments." The International Journal of Robotics Research 34, No. 3 (Mar. 2015): 251-55.
Cai, Minjie, Kris Kitani, and Yoichi Sato. "Understanding Hand-Object Manipulation by Modeling the Contextual Relationship between Actions, Grasp Types and Object Attributes." arXiv, Jul. 22, 2018.
Cai, Yujun, Liuhao Ge, Jianfei Cai, and Junsong Yuan. "Weakly-Supervised 3D Hand Pose Estimation from Monocular RGB Images." In Computer Vision—ECCV 2018, edited by Vittorio Ferrari, Martial Hebert, Cristian Sminchisescu, and Yair Weiss, 11210:678-94. Lecture Notes in Computer Science. Cham: Springer International Publishing, 2018.
Calli, Berk, Arjun Singh, Aaron Walsman, Siddhartha Srinivasa, Pieter Abbeel, and Aaron M. Dollar. "The YCB Object and Model Set: Towards Common Benchmarks for Manipulation Research." In 2015 International Conference on Advanced Robotics (ICAR), 510-17. Istanbul, Turkey: IEEE, 2015.
Chang, Angel X., Thomas Funkhouser, Leonidas Guibas, Pat Hanrahan, Qixing Huang, Zimo Li, Silvio Savarese, et al. "ShapeNet: An Information-Rich 3D Model Repository." arXiv, Dec. 9, 2015.
Chang, Ju Yong, Gyeongsik Moon, and Kyoung Mu Lee. "V2V-PoseNet: Voxel-to-Voxel Prediction Network for Accurate 3D Hand and Human Pose Estimation from a Single Depth Map." In 2018

(56) References Cited

OTHER PUBLICATIONS

IEEE/CVF Conference on Computer Vision and Pattern Recognition, 5079-88. Salt Lake City, UT, USA: IEEE, 2018.
Choi, Chiho, Sang Ho Yoon, Chin-Ning Chen, and Karthik Ramani. "Robust Hand Pose Estimation during the Interaction with an Unknown Object." In 2017 IEEE International Conference on Computer Vision (ICCV), 3142-51. Venice: IEEE, 2017.
Corona, Enric, Albert Pumarola, Guillem Alenya, and Francesc Moreno-Noguer. "Context-Aware Human Motion Prediction." arXiv, Mar. 23, 2020.
Corona, Enric et al.—Pose Estimation for Objects with rotational symmetry. IROS. 2018.
Cutkosky, M.R. "On Grasp Choice, Grasp Models, and the Design of Hands for Manufacturing Tasks." IEEE Transactions on Robotics and Automation 5, No. 3 (Jun. 1989): 269-79.
De-An Huang, Minghuang Ma, Wei-Chiu Ma, and Kris M. Kitani. "How Do We Use Our Hands? Discovering a Diverse Set of Common Grasps." In 2015 IEEE Conference on Computer Vision and Pattern Recognition (CVPR), 666-75. Boston, MA, USA: IEEE, 2015.
Do, Thanh-Toan, Anh Nguyen, and Ian Reid. "AffordanceNet: An End-to-End Deep Learning Approach for Object Affordance Detection." In 2018 IEEE International Conference on Robotics and Automation (ICRA), 1-5. Brisbane, QLD: IEEE, 2018.
Edwards, S.J et al—Developmental and functional hand grasps. Slcak 2002.
Ferrari, C. and Canny, J. F. Planning Optimal Grasps. ICRA, 1992.
Feix, Thomas, Roland Pawlik, Heinz-Bodo Schmiedmayer, Javier Romero, and Danica Kragic. "A Comprehensive Grasp Taxonomy," RSS, 2009.
Feix, Thomas, Javier Romero, Heinz-Bodo Schmiedmayer, Aaron M. Dollar, and Danica Kragic. "The GRASP Taxonomy of Human Grasp Types." IEEE Transactions on Human-Machine Systems 46, No. 1 (Feb. 2016).
Garcia-Hernando, Guillermo, Shanxin Yuan, Seungryul Baek, and Tae-Kyun Kim. "First-Person Hand Action Benchmark with RGB-D Videos and 3D Hand Pose Annotations." In 2018 IEEE/CVF Conference on Computer Vision and Pattern Recognition, 409-19. Salt Lake City, UT: IEEE, 2018.
Ge, Liuhao, Hui Liang, Junsong Yuan, and Daniel Thalmann. "Robust 3D Hand Pose Estimation in Single Depth Images: From Single-View CNN to Multi-View CNNs." In 2016 IEEE Conference on Computer Vision and Pattern Recognition (CVPR), 3593-3601. Las Vegas, NV, USA: IEEE, 2016.
Ge, Liuhao, Zhou Ren, Yuncheng Li, Zehao Xue, Yingying Wang, Jianfei Cai, and Junsong Yuan. "3D Hand Shape and Pose Estimation From a Single RGB Image," CVPR, 2019.
Groueix, Thibault, Matthew Fisher, Vladimir Kim, Bryan Russell, and Mathieu Aubry. "AtlasNet: A Papier-Mâché Approach to Learning 3D Surface Generation," CVPR, 2018.
Gualtieri, Marcus, Andreas ten Pas, Kate Saenko, and Robert Platt. "High Precision Grasp Pose Detection in Dense Clutter." arXiv, Jun. 22, 2017.
Gulrajani, Ishaan, Faruk Ahmed, Martin Arjovsky, Vincent Dumoulin, and Aaron C Courville. "Improved Training of Wasserstein GANs," NIPS, 2017.
Gupta, Abhinav, Scott Satkin, Alexei A. Efros, and Martial Hebert. "From 3D Scene Geometry to Human Workspace." In CVPR 2011, 1961-68. Colorado Springs, CO, USA: IEEE, 2011.
Hamer, Henning, Juergen Gall, Thibaut Weise, and Luc Van Gool. "An Object-Dependent Hand Pose Prior from Sparse Training Data." In 2010 IEEE Computer Society Conference on Computer Vision and Pattern Recognition, 671-78. San Francisco, CA, USA: IEEE, 2010.
Hamer, Henning, Konrad Schindler, Esther Koller-Meier, and Luc Van Gool. "Tracking a Hand Manipulating an Object." In 2009 IEEE 12th International Conference on Computer Vision, 1475-82. Kyoto, Japan: IEEE, 2009.
Hampali, Shreyas, Mahdi Rad, Markus Oberweger, and Vincent Lepetit. "HOnnotate: A Method for 3D Annotation of Hand and Object Poses." arXiv, May 30, 2020.
Hasson, Yana, Gul Varol, Dimitrios Tzionas, Igor Kalevatykh, Michael J. Black, Ivan Laptev, and Cordelia Schmid. "Learning Joint Reconstruction of Hands and Manipulated Objects." In 2019 IEEE/CVF Conference on Computer Vision and Pattern Recognition (CVPR), 11799-808. Long Beach, CA, USA: IEEE, 2019.
He, Kaiming, Xiangyu Zhang, Shaoqing Ren, and Jian Sun. "Deep Residual Learning for Image Recognition." In 2016 IEEE Conference on Computer Vision and Pattern Recognition (CVPR), 770-78. Las Vegas, NV, USA: IEEE, 2016.
Hu, Yinlin, Joachim Hugonot, Pascal Fua, and Mathieu Salzmann. "Segmentation-Driven 6D Object Pose Estimation." In 2019 IEEE/CVF Conference on Computer Vision and Pattern Recognition (CVPR), 3380-89. Long Beach, CA, USA: IEEE, 2019.
Iqbal, Umar, Pavlo Molchanov, Thomas Breuel, Juergen Gall, and Jan Kautz. "Hand Pose Estimation via Latent 2.5D Heatmap Regression." In Computer Vision—ECCV 2018, edited by Vittorio Ferrari, Martial Hebert, Cristian Sminchisescu, and Yair Weiss, 11215:125-43. Lecture Notes in Computer Science. Cham: Springer International Publishing, 2018.
Keskin, Cem, Furkan Kraç, Yunus Emre Kara, and Lale Akarun. "Hand Pose Estimation and Hand Shape Classification Using Multi-Layered Randomized Decision Forests." In Computer Vision—ECCV 2012, edited by Andrew Fitzgibbon, Svetlana Lazebnik, Pietro Perona, Yoichi Sato, and Cordelia Schmid, 7577:852-63. Lecture Notes in Computer Science. Berlin, Heidelberg: Springer Berlin Heidelberg, 2012.
Kim, Min Ku, Ramviyas Nattanmai Parasuraman, Liu Wang, Yeonsoo Park, Bongjoong Kim, Seung Jun Lee, Nanshu Lu, Byung-Cheol Min, and Chi Hwan Lee. "Soft-Packaged Sensory Glove System for Human-like Natural Interaction and Control of Prosthetic Hands." NPG Asia Materials 11, No. 1, 2019.
Kokic, Mia, Danica Kragic, and Jeannette Bohg. "Learning Task-Oriented Grasping from Human Activity Datasets." arXiv, 2019.
Kokic, Mia, Danica Kragic, and Jeannette Bohg. "Learning to Estimate Pose and Shape of Hand-Held Objects from RGB Images." arXiv, Nov. 11, 2019.
Kumra, Sulabh, and Christopher Kanan. "Robotic Grasp Detection Using Deep Convolutional Neural Networks." arXiv, Jul. 21, 2017.
La Gorce, M. de, D. J. Fleet, and N. Paragios. "Model-Based 3D Hand Pose Estimation from Monocular Video." IEEE Transactions on Pattern Analysis and Machine Intelligence 33, No. 9 (Sep. 2011.
Lai, Kevin, Liefeng Bo, Xiaofeng Ren, and Dieter Fox. "A Large-Scale Hierarchical Multi-View RGB-D Object Dataset," ICRA, 2011.
Lau, Manfred, Kapil Dev, Weiqi Shi, Julie Dorsey, and Holly Rushmeier. "Tactile Mesh Saliency." ACM Transactions on Graphics. 2016.
Lei, Jie, Mingli Song, Ze-Nian Li, and Chun Chen. "Whole-Body Humanoid Robot Imitation with Pose Similarity Evaluation." Signal Processing. 2015.
Lenz, Ian, Honglak Lee, and Ashutosh Saxena. "Deep Learning for Detecting Robotic Grasps." The International Journal of Robotics Research 34, No. 4-5—Apr. 2015.
Lepetit, Vincent, Francesc Moreno-Noguer, and Pascal Fua. "EPnP: An Accurate O(n) Solution to the PnP Problem." International Journal of Computer Vision 81, No. 2 (Feb. 2009.
Levine, Sergey, Peter Pastor, Alex Krizhevsky, Julian Ibarz, and Deirdre Quillen. "Learning Hand-Eye Coordination for Robotic Grasping with Deep Learning and Large-Scale Data Collection." The International Journal of Robotics Research 37, No. 4-5—Apr. 2018.

* cited by examiner

SYSTEM AND METHOD FOR DETERMINING A GRASPING HAND MODEL

PRIORITY INFORMATION

The present application is a continuation-in-part of U.S. patent application Ser. No. 17/341,970, filed on Jun. 8, 2021, and claims priority, under 35 U.S.C. § 120, from said U.S. patent application Ser. No. 17/341,970, filed on Jun. 8, 2021, said U.S. patent application Ser. No. 17/341,970, filed on Jun. 8, 2021 claims priority, under 35 U.S.C. § 119(e), from U.S. Provisional Patent Application, Ser. No. 63/208,231, filed on Jun. 8, 2021; said U.S. patent application Ser. No. 17/341,970, filed on Jun. 8, 2021, claims priority under 35 U.S.C. § 119(a) to Spanish Patent Application Number ES 202030553, filed on Jun. 9, 2020. The entire content of U.S. patent application Ser. No. 17/341,970, filed on Jun. 8, 2021, is hereby incorporated by reference.

The present application claims priority, under 35 USC § 119(e), from U.S. Provisional Patent Application, Ser. No. 63/208,231, filed on Jun. 8, 2021. The entire content of U.S. Provisional Patent Application, Ser. No. 63/208,231, filed on Jun. 8, 2021, is hereby incorporated by reference.

The present application claims priority, under 35 U.S.C. § 119(a), from Spanish Patent Application Number ES 202030553, filed on Jun. 9, 2020. The entire content of Spanish Patent Application Number ES 202030553, filed on Jun. 9, 2020 is hereby incorporated by reference.

BACKGROUND

In the state of the art, learning from human demonstrations (LfD) is a popular approach for teaching robots new skills without explicitly programming them. In LfD, a robot follows the example of a person whose body or hand pose is extracted and imitated by the robot's own kinematic configuration.

This learning paradigm, however, requires the human to perform the same task, or a very similar one, to the task to be learned by the robot.

Robotic grasping is a widely investigated topic, wherein most of the previous approaches have considered simple grippers with a reduced number of contact points, which would be equivalent to a human hand grasping an object using only two fingers.

Some recent approaches have studied human centered tasks based on deep learning algorithms, such as pose estimation, reconstruction, and motion prediction.

Hand pose estimation has been largely studied in recent years, partially spurred by the availability of numerous annotated datasets and the emergence of low-cost commodity depth sensors.

Nevertheless, most of these studies tackle hand pose estimation from RGB-D images, leveraging the 2.5D information contained in depth images to directly predict 3D hand joint locations.

Even more recently, some effort has been made to tackle the more challenging task of 3D hand shape prediction, instead of 3D joint location, from RGB images. These methods are based on the parametric model MANO (see Javier Romero, Dimitrios Tzionas, and Michael J. Black, "Embodied hands: Modeling and capturing hands and bodies together" SIGGRAPH, 36(6), November 2017, which is incorporated herein by reference), which provides a 51 degrees of freedom (DoF) low-dimensional representation of the space of all possible human hands. A differentiable layer that deterministically maps from pose and shape parameters to hand joints and vertices allows deep models to be trained using performance metrics on the 3D mesh.

In this field, although earlier work was based on iterative optimization or comparisons to a reference database, recent methods make use of deep learning.

Some works have tackled also hand pose estimation in the more complex scenario of a hand, or two hands, grasping or manipulating an object. The significant occlusions resulting from the manipulated object make the problem much more difficult compared to observing an isolated hand.

Most of these works consider solid objects, who deal with deformable objects. For example, some approaches solve the problem as a classification task over a taxonomy of 71 grasps, wherein each grasp corresponds to a particular hand pose and certain contact points and forces. Other approaches recently proposed datasets to predict possible grasping contact points directly on the objects.

Other recent works jointly predict object and hand pose, or object and hand 3D meshes. Also, synthetic datasets of hands grasping objects have been built using a simulator, called GraspIt Simulator (see publication by Andrew T Miller and Peter K Allen, entitled "Graspit! A versatile simulator for robotic grasping," in IEEE Robotics & Automation Magazine, vol. 11, no. 4, pp. 110-122, December 2004, which is incorporated herein by reference).

Also, several grasp taxonomies have been proposed in the past, representing grasps in manufacturing tasks, also including a variety of unusual grasps and features such as grasp force, motion and stiffness and, more recently, including also manipulation primitives for cloth handling based on hand object contacts characterized as point, line and plane.

Other works have suggested to automatically define a taxonomy by clustering joint positions in a data-oriented approach to better understand activities or grasping poses.

Past works have mainly tried to predict saliency points in objects for grasping, applying deep learning to detect graspable regions of an object. Mostly, these grasps are predicted from the 3D structure of the object, first sampling thousands of grasp candidates and, then, pushing an open robot gripper until making contact with a mesh of the object. Then, the grasp candidates not containing parts of the point-cloud between fingers are discarded, and a grasp quality is classified using convolutional neural networks. This approach is similar to the one used in GraspIt simulator, which allows the simulation of grasps for given hand and object 3D models.

Thus, it is desirable to provide a method for determining a grasping hand model which emulates how a human would naturally grasp one or several objects, given at least one image of these objects.

It is further desirable to provide a method intended for outputting an operable hand model showing several contact points with the target object but no intersection with other elements of the scene for predicting human grasp, i.e., the most probable hand shape and pose that would allow to grasp an observed object, wherein a hand model is defined by a hand pose and shape, and grasp type.

BRIEF DESCRIPTION OF THE DRAWINGS

To complement the description and to aid towards a better understanding of the characteristics of the invention, in accordance with an example of a practical embodiment thereof, a set of drawings is attached as an integral part of the description wherein, with illustrative and non-limiting character, the following has been represented.

DETAILED DESCRIPTION OF THE DRAWINGS

Figure 1:
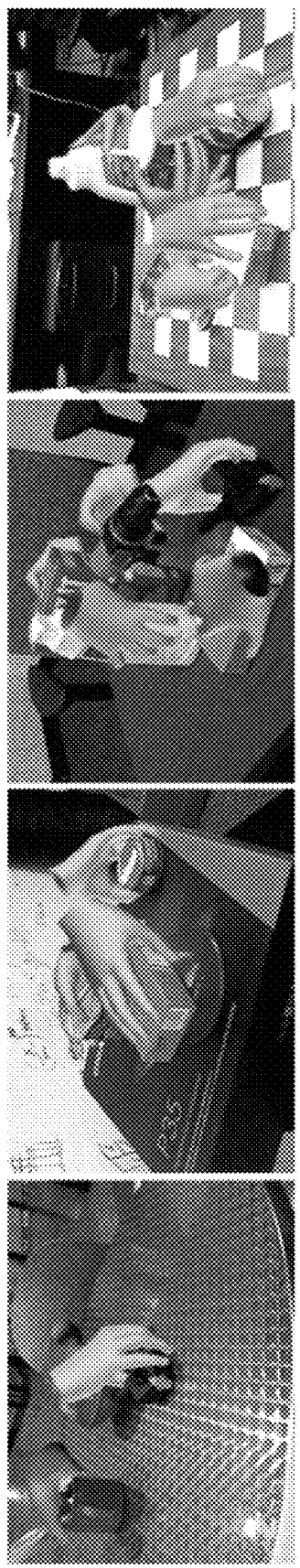
FIG. 1 illustrates grasping hand models obtained for the objects in the images.

Predicting human grasps, is a very challenging problem as it requires modeling the physical interactions and contacts between a high-dimensional hand model and a potentially noisy three-dimensional (3D) representation of the objects estimated from the input RGB images. This is a significantly more complex problem than that of generating robotic grasps, as robot end-effectors have much less degrees of freedom (DoF) than the human hand.

Furthermore, the common practice in robotics is to use a RGB camera with a depth sensor (RGB-D camera), which, despite simplifying the process of modeling the geometry of the objects, does not have the versatility of standard RGB cameras.

The disclosed method is based in a deep generative network, which splits out the determination of the grasping hand model in a classification task and a regression task, allowing to select a hand pose and to refine it for improving the quality of the model. Therefore, a coarse-to-fine approach is used, where hand model prediction is first addressed as a classification problem followed by a refinement stage. Further, different grasping qualities are maximized at the same time, improving grasping hand models generated.

Preferably, the disclosed method could employ the MANO model (hand Model with Articulated and Non-rigid defOrmations), which is a 51-degrees of freedom human hand model, thus, increasing the capacity of robots to perform more difficult grasps. This model also increases the accuracy of the final output by defining and refining the model comprising more degrees of freedom.

The disclosed method represents a generative model with a generative adversarial network (GAN) architecture (Generator and Discriminator), which comprises the following steps:

a) obtaining at least one image comprising at least one object;

b) estimating a pose and shape of the object from the first image of the object;

c) predicting a grasp taxonomy (i.e., a class) from a set of grasp taxonomies (i.e., a set of grasp classes) by means of artificial neural networks algorithms, preferably, a Convolutional Neural Network, with a cross entropy loss $L_{class}$ (later defined), thus, obtaining a set of parameters defining a grasping hand model;

d) refining the grasping hand model, by minimizing loss functions referring to the parameters of the grasping hand model; and e) obtaining a representation of a hand grasping the object by using the refined grasping hand model, preferably obtaining a mesh of the hand pose.

Therefore, the model allows, given at least one input image, to: 1) estimate or regress the 6D pose (or 3D pose and 3D shape) of the objects in the scene; 2) predict the best grasp type according to a taxonomy; and 3) refine a coarse hand configuration given by the grasping taxonomy to gracefully adjust the fingertips to the object shape, through an optimization of the 51 parameters of the MANO model that minimize a graspability loss. This process involves maximizing the number of contact points between the object and the hand shape model while minimizing the interpenetration.

The disclosed method could be configured for receiving as input an RGB image or a depth image of an object, or alternatively, a 3D image. Although depth images encode 3D information, they only correspond to partial 3D information of the object, ignoring the occluded 3D surface.

In order to predict feasible grasps, an understanding is needed of the semantic content of the image, its geometric structure and all potential interactions with a hand physical model, which is carried out by the step of estimating a pose and shape of the object.

The step could be performed by carrying out an object reconstruction phase, thus, obtaining a cloud of points representing the object from the obtained image, preferably by using a pre-trained and fine-tuned ResNet-50. This reconstruction method does not require knowing the object beforehand but is not reliable in case of multiple objects.

If the RGB image comprises more than one object, steps b) to e) above would be repeated for each object in the image, assuming that the objects are known.

During training, one object is randomly selected at a time, whose 3D shape is known, the 3D shape is projected onto the image plane to obtain a segmentation mask that is then concatenated with the input image while the original RGB image gives contextual information about the entire scene for a more operable grasp.

The disclosed method enables predicting operable grasps, even in cluttered scenes with multiple objects in close contact, and predicting how a human would grasp one or several objects, given one or more images of these objects.

The input image could be encoded using a pre-trained Convolutional Neural Network, preferably a ResNet architecture, and a coarse configuration of the most probable hand pose that would grasp the object is obtained. This initial estimation is formulated as a classification problem, among a reduced number of taxonomies. Therefore, the grasp class C that best suits the target object is predicted from the taxonomies by using a classification network with a cross entropy loss $L_{class}$, defined by Equation (1). Preferably a set of 33-grasp taxonomy is selected.

$$L_{class} = \Sigma_{c \in K} C_{o,c} \log(1 - P_{o,c}) \qquad \text{Equation (1)}$$

In Equation (1), C represents a grasp type for the particular object (o), c represents the grasp classes among the K possible grasps classes, and P represents pose predictions for the particular object (o).

The predicted grasping hand model is centered on itself and will be aligned in the camera coordinate system. Therefore, the step of selecting a grasp taxonomy could further comprise a phase of predicting an absolute translation and rotation of the hand pose and a configuration of the hand pose by means of a fully connected network for aligning the hand pose to the camera coordinate system. At training, the absolute rotation represents the rotation from a ground truth grasp with added noise. Thus, an absolute rigid pose of a coarse estimation of the hand is obtained, adding an increment for the translation and rotation and the coarse configuration. It was observed that using this strategy of predicting the increment for each of the parameters significantly speeds up convergence during training and improves results.

The different taxonomies are created by clustering a large number of hand poses, thus, defining a number of grasp classes that could be used as an initial stage to roughly approximate the hand configuration.

The classification result is, therefore, a coarse representation, which requires it to be aligned with the object and refined. Therefore, the hand model is refined such that it is adapted to the object geometry.

To enforce the feasibility of the predicted grasping hand models, a differentiable and parameter-free layer based in a GAN architecture is used, where a discriminator classifies the feasibility of the grasp given the hand pose and contact points, thus maximizing grasp metrics. Thus, the discriminator ensures that the predicted hand shapes are operable by avoiding self-collisions with other objects within a scene.

A refinement module is used, preferably being a fully connected network, that takes as input the output of the classification problem and the geometric information about the object, to output a refined predicted hand pose $H_o$, a rotation $R_o$ and a relative translation $T_o$, where the positions of the fingers are optimized to gracefully fit the object 3D surface.

The refinement step is performed by optimizing a loss function that minimizes the distance between the hand model and the object, while preventing the interpenetration and aiming to generate human-like grasps. The loss functions to be optimized is a combination of the following groups (a, b, and c):

(a) Distance between the object vertices and arcs obtained when rotating an angle of the finger's vertices about joint axes. In this case, for each finger 3 rotations are considered, one for each articulation. Following the kinematic chain, from the knuckle to the last joint, the finger is bent, within its physical limits, until it contacts the object.

Formally, this is achieved by minimizing the distance (D) between the object vertices ($O_k$) and any of the arcs obtained when rotating an angle $\theta$ the finger's vertices about the joint axes, as represented in Equation (2):

$$D_\theta \leftarrow \min_i(\min_k(\|A_i^\theta, O_k\|_2)) \qquad \text{Equation (2)}$$

Wherein $A_i^\theta$ is the arc obtained when rotating $\theta$ degrees the i-th vertex of the finger from the set of object vertices ($O_k$).

Given Equation (2) to compute the arc, the angle ($\gamma_j'$) that the finger needs to be rotated around the first joint to collide with the object can then be estimated, which is represented by the Equation (3):

$$\gamma_j' \leftarrow \arg\min_\theta D_\theta + \delta, \forall \theta s.t. \ D_\theta < t_d \qquad \text{Equation (3)}$$

Wherein $\delta$ (angle) is a hyperparameter that controls the interpenetration of the hand into the object and hence the grasp stability. Additionally, an upper boundary threshold ($t_d$) is defined, for defining when there is object-finger contact, preferably 2 mm.

From these two equations the following loss functions can be defined that will be used to train the model:

$$L_{arc} = \frac{1}{|J|}\sum_{j\in J} D_\theta^j \quad L_\gamma \leftarrow \sum_j^J \|\gamma_j' - \gamma_j\|_2 \qquad \text{Equation (4)}$$

Wherein $|J|=5$ is the number of fingers, $L_{arc}$ aims to minimize the hand-object distances when rotating the first joint of each finger, and $L_\gamma$ directly operates on the estimated angles and compares them with the ground truth ones $\gamma_j$, at training.

(b) Distance between the fingertips and the object 3D surface. To enforce the stability of the grasps, firstly, hand vertices in the fingers ($V_{cont}$) that are more likely to be in contact with the target object ($O^t$) are identified and the loss defined by Equation (5) is optimized:

$$L_{cont} = \frac{1}{|V_{cont}|}\sum_{v\in V_{cont}} \min_k \|v, O_k^t\|_2 \qquad \text{Equation (5)}$$

Wherein hand vertices in the fingers ($V_{cont}$) are computed as the vertices close to the object in at least 8% of the ground truth samples from the training. They are mostly concentrated on the fingertips and the palm of the hand.

Interpenetration between the hand and the object. If the fingers are close enough to the object surface and the hand shape is operable, the previous losses can reach a minima even if the hand is incorrectly placed inside the object. To avoid this situation, the interpenetration between the predicted hand and reference object meshes is penalized.

For doing this, a ray is beamed from the origin camera position to each hand vertex and counting the number of times the ray intersects the object, determining whether hand vertices are inside or outside the object. Considering $V_i$ to be the set of hand vertices that are inside the object, the minimum distance of each of them to the closest object surface point may be minimized using the loss function:

$$L_{int} = \frac{1}{|V_i|}\sum_j^{|O|} \sum_{v\in V_i} \min_k \|v, O_k^j\|_2 \qquad \text{Equation (6)}$$

Interpenetration below the table plane. Hand configurations that are below the table plane are penalized, by calculating the distance from each hand vertex to the table plane, and favoring this distance to be positive.

$$L_p = \Sigma_v^v \min(0, |(v-p_p)\cdot v_p|) \qquad \text{Equation (7)}$$

Wherein $p_p$ represents a point of the table plane and $v_p$ represents a normal pointing upwards.

(c) Anthropomorphic hands. To generate anthropomorphic hands and operable grasping hand models, a discriminator D trained using a Wasserstein loss is introduced. G being the trainable model defined, H*, R*, T* the ground truth training samples (samples from the training set), and $\tilde{H}$, $\tilde{R}$, $\tilde{T}$ interpolations between correct samples and predictions. Then, the adversarial loss is defined as:

$$L_{adv} = -E_{H,R,T \sim p(H,R,T)}[D(G(I))]E_{H,R,T \sim p(H,R,T)}[D(H^*, R^*, T^*)]$$  Equation (8)

Additionally, to guarantee the satisfaction of the Lipschitz constraint in the W-GAN, introduce a gradient penalty loss $L_{gp}$.

Finally, the total loss L to be minimized is a linear combination of all previous loss functions, corresponding different weights to each loss: $L_{class}$, $L_{arc}$, $L_{gp}$, $L_\gamma$, $L_{cont}$, $L_{int}$, $L_p$, $L_{adv}$.

$$L = \lambda_{class}L_{class} + \lambda_{arc}L_{arc} + \lambda_{gp}L_{gp} + \lambda_\gamma L_\gamma + \lambda_{cont}L_{cont} + \lambda_{int}L_{int} + \lambda_p L_p + \lambda_{adv}L_{adv}$$  Eq. 9

Wherein $\lambda_{class}$, $\lambda_{arc}$, $\lambda_{gp}$, $\lambda_\gamma$, $\lambda_{cont}$, $\lambda_{int}$, $\lambda_p$, $\lambda_{adv}$ are hyper-parameters, weighing the contribution of each loss function.

Objects can generally be grasped in several ways. Therefore, the object could be randomly rotated several times on the Quaternion sphere, and for each rotation, the refinement network generates an operable grasp for the orientation. Thus, the disclosed method allows prediction of a set of different operable grasps for the same object.

Then the operable grasps generated may be evaluated by calculating metric parameters, and the highest-scoring ones would be selected. Such grasps may be evaluated using different metrics, such as:

An analytical grasp metric, which computes an approximation of the minimum force to be applied to break the grasp stability.

An average number of contact fingers, wherein numerous contact points between hand and object favor a strong grasp.

A hand-object interpenetration volume, wherein object and hand are voxelized, and the volume shared by both 3D models is computed.

A simulation displacement of the object mesh subjected to gravity.

A percentage of graspable objects for which an operable grasp could be predicted, being an operable grasp the one with at least two contact points and no interpenetration.

The disclosed method could also take into account object grasping preferences given functional intent, shape, and semantic category, for improving grasping model. The disclosed method could also be employed to synthesize training examples in a data-driven framework.

The disclosed method has an enormous potential in several fields, including virtual and augmented reality, human-robot interaction, robot imitation learning, and new avenues in areas like prosthetic design.

The disclosed method determines a grasping hand model. The disclosed method takes as input an RGB image, which is proposed so as to determine a coarse grasping hand model; i.e., a hand configuration a translation and a rotation vector. The coarse grasping hand model is obtained by using a neural network as a classification problem, wherein a grasp taxonomy is selected from a group of taxonomies. Then, the coarse grasping hand model is refined by optimizing one or more loss functions, thus obtaining a refined hand shape and pose.

In particular, the disclosed method may be used to determine grasping possibilities given an RGB image comprising multiple objects in a cluttered scene.

The disclosed method is applied to each object in a scene, and grasping hand models for each object are obtained. In FIG. 1, the grasping hand models obtained for the objects of each image are shown. FIG. 1 shows four sample results on a YCB-Affordance dataset, which has been created for testing the disclosed method.

Figure 2:
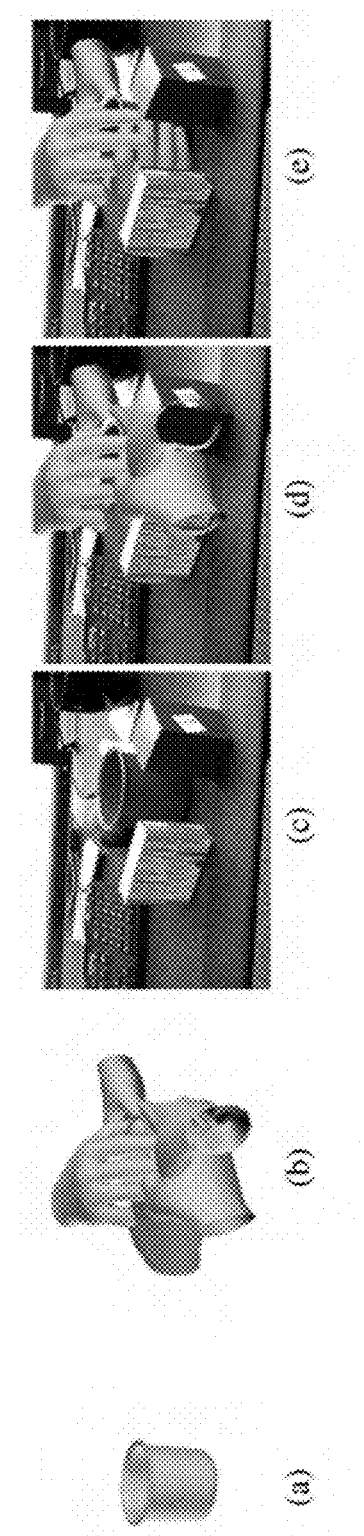
FIG. 2 sets forth steps of a training method for annotating images so as to train the neural networks for obtaining grasping hand models.

FIG. 2 shows steps of a training method for annotating images so as to train the neural networks for obtaining grasping hand models. The training method in this case is applied to an image having three objects. Firstly, a model of one of the objects is obtained, as depicted in step (a). Then, manually, a set of operable grasping hand models is annotated over the model; in this case just 5 hand models are depicted in step (b). An image is obtained, wherein the object is contained, and more objects are also present, as in case of step (c). Then, all the grasping hand models are transferred to the image as shown in step (d). From all the grasping hand models transferred, just operable hand models are selected, wherein the operable hand models do not collide with other objects in the scene. In case of step (e), only three hand models are selected for representation, but a lot of more hand models could be obtained. The training method allows the obtaining of annotated images which feeds the neural networks.

Figure 4:
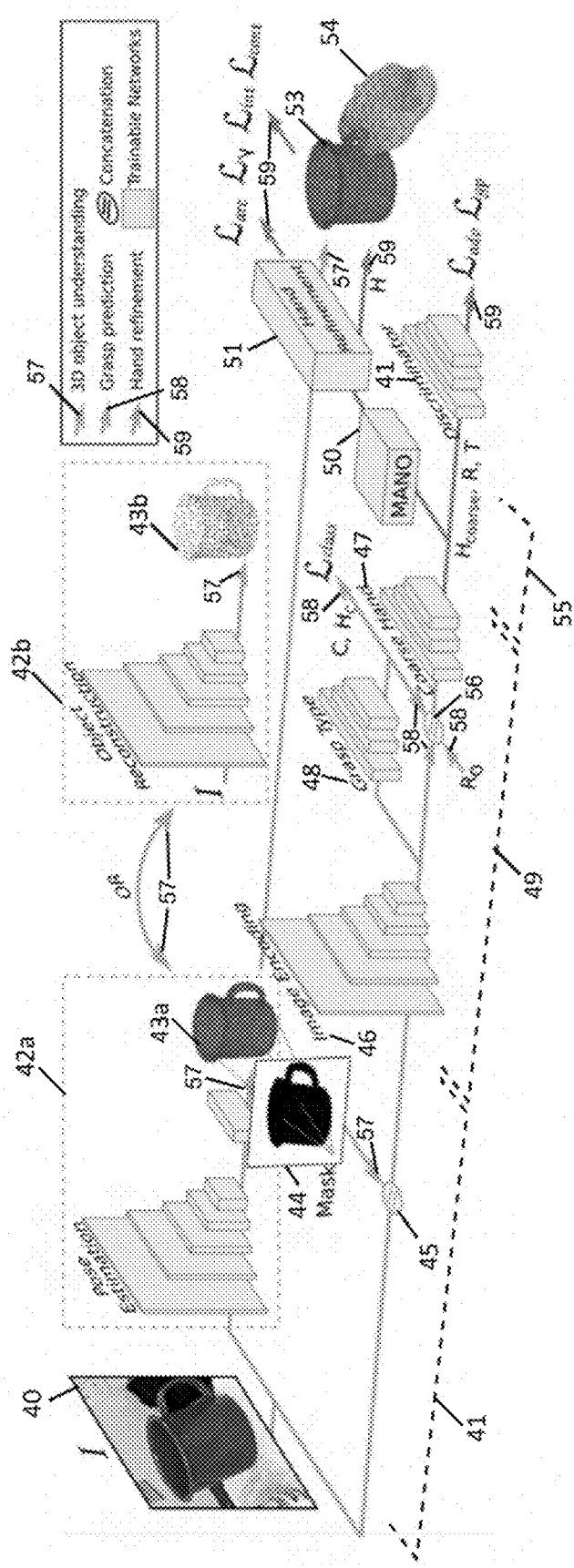
FIG. 4 illustrates a representation of the disclosed method.

FIG. 4 shows a representation of the disclosed method. Generally, the disclosed method consists of three stages. In a first stage, the objects' shapes and locations are estimated in a scene using a first sub-network 41 that is an object 6D pose estimator 42a (which is used when the object to be manipulated is known to obtain an object model for estimating a pose and a shape of the object) or a reconstruction network 42b (which is used when the object to be manipulated is unknown).

In a second stage, a mask and input image are fed to a second sub-network 49 for grasp prediction.

In a third stage, the hand parameters are refined and the hand final shapes and poses are obtained using the parametric model MANO.

More specifically, the disclosed method, as illustrated in FIG. 4, comprises the steps of:

obtaining a single RGB image 40 of one or several objects for predicting how a human would grasp these objects naturally, feeding a first sub-network 41 for 3D object understanding 57 for estimating objects' shapes and locations in the scene using an object 6D pose estimator 42a or a reconstruction network 42b, the predicted shape (43a from an object 6D pose estimator 42a or 43b from reconstruction network 42b) is then projected onto the image plane to obtain a segmentation mask 44, concatenating at 45 the segmentation mask 44 with the input image 40, feeding a second sub-network 49 for grasp prediction 58 (which includes image encoding network 46, grasp type network 48 and coarse hand network 47) with the segmentation mask concatenated with the image at 45 for predicting a grasp taxonomy (i.e. a grasp class) from a set of grasp taxonomies (i.e., a set of grasp classes) to obtain a set of parameters defining a coarse grasping hand model, obtaining a coarse hand model (with parameters $H_{coarse}$ (hand), R (rotation), T (translation)) output from coarse hand network 47 processing input from a grasp prediction neural network 48 (which predicts a class label C with corresponding shape of the hand $H_c$) using rotation input $R_o$ (which is known during training, and which is determined at inference with candidates that are uniformly sampled while running the coarse hand network 47 multiple times, and while keeping the top-scoring hand for each object identified in the image) concatenated at 56 with the output of image encoding network 46 (which is also input to grasp type network 48) which encodes the segmentation mask concatenated with the image at 45 (i.e., a feature vector that focuses on the object's appearance in the image), and refining, with a third sub-network 55, hand parameters (i.e., hand refinement 59) of the coarse hand model output by coarse hand network 47 (having parameters C and $H_c$) for obtaining a refined hand model output from hand refinement network 51 (having parameters H, R (rotation) and T (translation)), which in this embodiment uses the parametric model MANO 50, the hand refinement network 51 refining the position of the fingers of the hand 54 to fit the object 53 segmented by the first sub-network 41.

The disclosed method is trained using adversarial, interpenetration, classification, and optimization losses using discriminator 41, which is only used at training and not at inference (i.e., runtime).

Figure 3:
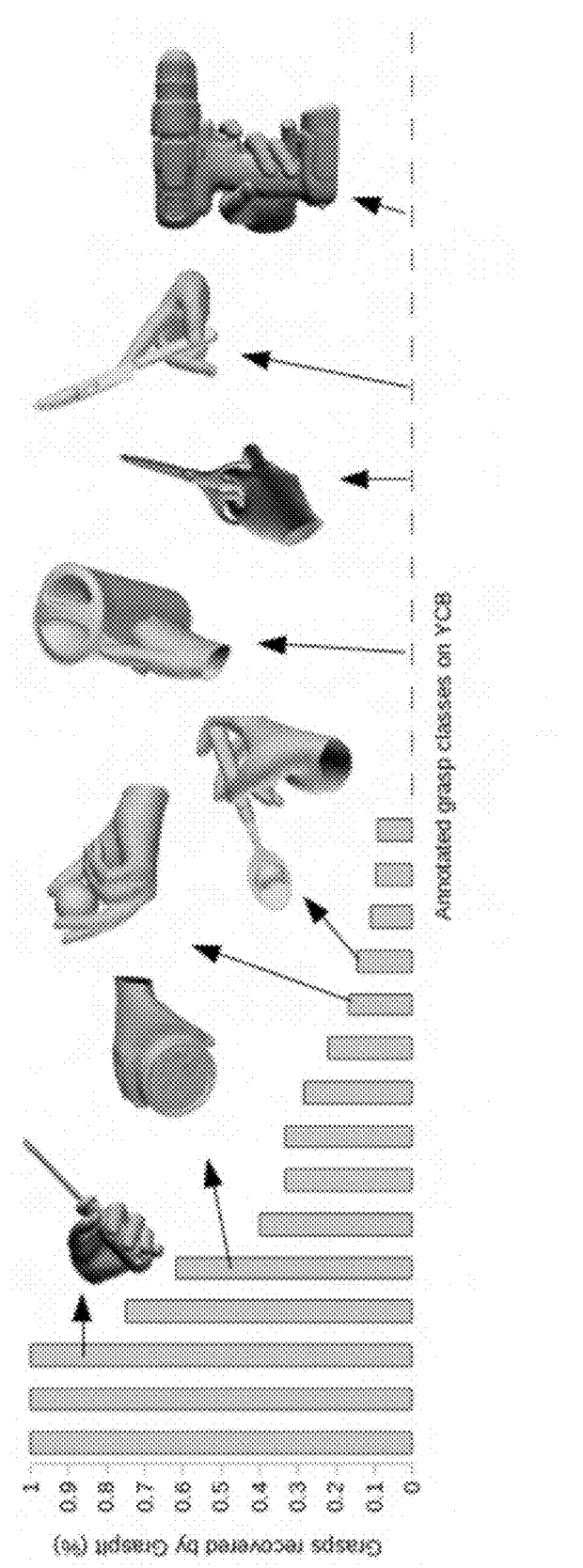
FIG. 3 illustrates a comparison between the disclosed method and a GraspIt simulator.

FIG. 3 shows a comparison between the disclosed method and a simulator known in the state of the art: GraspIt. In the FIG. 3, it is shown a percentage of hand models found through the simulator compared to the ones obtained with the disclosed method.

When provided with the CAD models of the objects, the simulator only recovered a portion of the natural grasps that are annotated in the disclosed method. Therefore, manually annotating the hand models in the training method provides more realism to the hand models obtained by the disclosed method. As shown, the simulator is able to obtain the same number of operable hand models in simple objects. However, few operable hand models are found by the simulator while hands are on objects which require abducted thumbs or accurate grasps operable.

For evaluating the quality of the grasping hand models generated, some evaluation metrics are considered:

- An analytical grasp metric is used to score a grasp, which computes an approximation of the minimum force to be applied to break the grasp stability.
- An average number of contact fingers can also be used to measure the quality of a grasp since numerous contact points between hand and object favor a strong grasp.
- A hand-object interpenetration volume could be computed. Object and hand are voxelized, and the volume shared by both 3D models is computed, using a voxel size of 0.5 cm$^3$.
- A simulation displacement of the object mesh is computed, when the object is subjected to gravity in simulation.
- A percentage of graspable objects, for which an operable grasp could be predicted, is computed, being an operable grasp the one with at least two contact points and no interpenetration.

The disclosed method has been trained for grasp affordance prediction in multi-object scenes using natural images showing multiple objects annotated with operable human grasps.

Therefore, a first large-scale dataset that includes hand pose and shape for natural and operable grasping in multi-object scenes has been collected. To do so, a YCB-Video Dataset with operable human grasps has been augmented. The YCB dataset contains more than 133K frames from videos of 92 cluttered scenes with highly occluded objects whose 6D pose was annotated in camera coordinates.

Thus, a dataset has been created, called YCB-Affordance, which features grasps for all objects from the YCB (Yale-CMU-Berkeley) Object set for which a CAD model was available. These include 58 diverse household objects of particular interest for grasping and manipulation tasks, such as tools, cutlery, food or more basic shape structures.

Each CAD model was first annotated with operable grasps, and, then, the resulting grasps were transferred to the YCB scenes and images, yielding more than 28 million grasps for 133K images.

In the annotation step, operable grasps were manually annotated to cover all possible ways to naturally pick up or manipulate the objects. In this case, the visual interface of the GraspIt simulator was used to manually adapt the hand palm position and rotation, and each of the finger joint angles.

An integration of the GraspIt simulator with a Skinned Multi-Person Linear Model (SMPL) is used to directly retrieve a low-dimensional MANO representation of the hand model, and to obtain posed and registered hand shape meshes.

On average, symmetric objects, such as cans or bottles, were annotated with 6 distinct grasps, and more complex objects, such as tools or cutlery, were annotated with up to 12 different grasps. In total, 367 different fine-grained grasps were manually annotated and a grasp type within a 33-grasp taxonomy was assigned thereto.

The taxonomy was defined considering the position of the contact fingers, the level of power/precision tradeoff in the grasp and the position of the thumb. Then, rotational symmetries were annotated in all the objects from the YCB Object set considering each main axis.

A rotational symmetry is represented by its order, which indicates the number of times an object can be rotated on a particular axis and results in an equivalent shape. Taking advantage of objects' symmetry, the number of grasps has been automatically extended by simply rotating the hand around the axes; e.g., repeating grasps along the revolution axis.

The generation of grasps using GraspIt simulator only leads to a reduced set of grasping hand models which maximize the analytical grasp score but are not necessarily correct or natural; e.g., holding a knife by the blade or grasping a cup with 2 fingers. Instead of that, in the YCB-Affordance dataset, by manually annotating the images only operable grasping hand models are included; even hand models that GraspIt would never find, such as grasping scissors.

The scenes in the YCB-Video Dataset contain between 3 and 9 objects in close contact. Often, the placement of the objects makes them not easily accessible for grasping without touching other objects. For this reason, only the scenes with operable and feasible grasps are annotated; i.e., grasps for which the hand does not collide with other objects.

To do so, the 6D pose annotations of the CAD models in camera coordinates available for the different objects are used. Also, for a more complete 3D representation of the scene, the position of the table plane is also manually annotated. In practice, this was manually done in the first frame of each video and propagated through the remaining frames using the motion of the camera in consecutive frames.

Then, all the grasps annotated on the 3D CAD models are transferred to the real scenarios, using ground-truth 6D object poses and selecting only operable grasps for which the hand 3D mesh does not intersect with the objects 3D CAD models or the table plane. In most cases, several possible grasps remain operable for each object.

However, the YCB Video dataset contains a few challenging scenes where an object is placed in a way that other objects occlude it too much for it to be grasped without any collision. In such cases, the object is considered as not reachable and left without grasp annotation. The final dataset contains 133,936 frames with more than 28 M operable grasp annotations, which is a suitable size to train deep networks.

The contribution of an optimization layer is evaluated when included in a state-of-the-art method for hand shape estimation. Then, the disclosed method is validated on the single-object synthetic ObMan dataset and fully evaluated in multi-object scenes with the YCB-Affordance dataset created.

Figure 6:
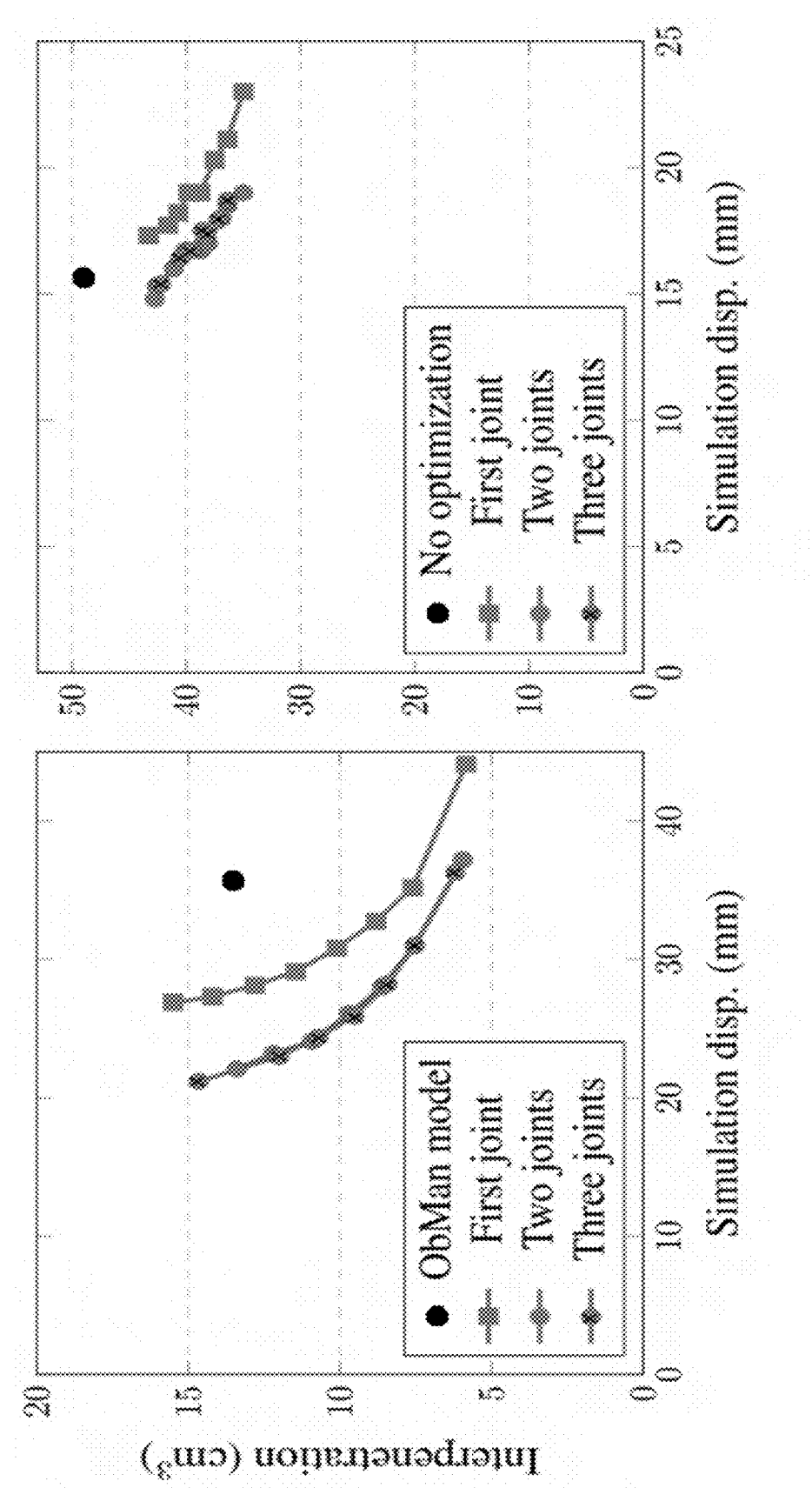
FIG. 6 illustrates impact of the optimization layer, both in the hand-object reconstruction pipeline (left) and in the grasp prediction pipeline (right)

FIG. 6 shows quantitative data of the impact of the optimization layer, both in the hand-object reconstruction pipeline and in the grasp prediction pipeline. The angle of rotation of the finger around a joint for minimizing the distance between the finger and the object is modulated by a hyperparameter ($\delta$). FIG. 6 shows a trade-off between interpenetration and the simulation displacement, by varying the hyperparameter ($\delta$), taking into account that the lower the interpenetration and the simulation displacement are, the better the hand model is considered. First, second, and all three joints of each finger are optimized by the optimization layer and the results are depicted in FIG. 6.

In the left graph in FIG. 6, the contribution of the optimization layer in the hand-object reconstruction pipeline is shown, and in the right graph in FIG. 6, the contribution of the optimization layer in grasp prediction is shown. As shown, the proposed layer provides a significant improvement in the hand-object reconstruction results, reducing simulation displacement and interpenetration metrics by more than 30%, and also grasp prediction pipeline is improved.

In one embodiment, a baseline method made of a pretrained ResNet-50 model that directly predicts the MANO representation of the hand, rotation and translation, still using layers for '3D scene understanding' and 'hand refinement' but lacking the grasp taxonomy prediction.

The ObMan dataset contains around 150 k synthetic hand-object pairs with successful grasps produced using GraspIt for 27 k different objects. Around 70 k grasps were simulated for each object, keeping only the grasps with highest score. In this case, images showing each object alone were used and basic background textures were added. This is a simplified version of the disclosed method which does not consider intersections with other elements of the scene, such as the plane and objects.

Figure 5:
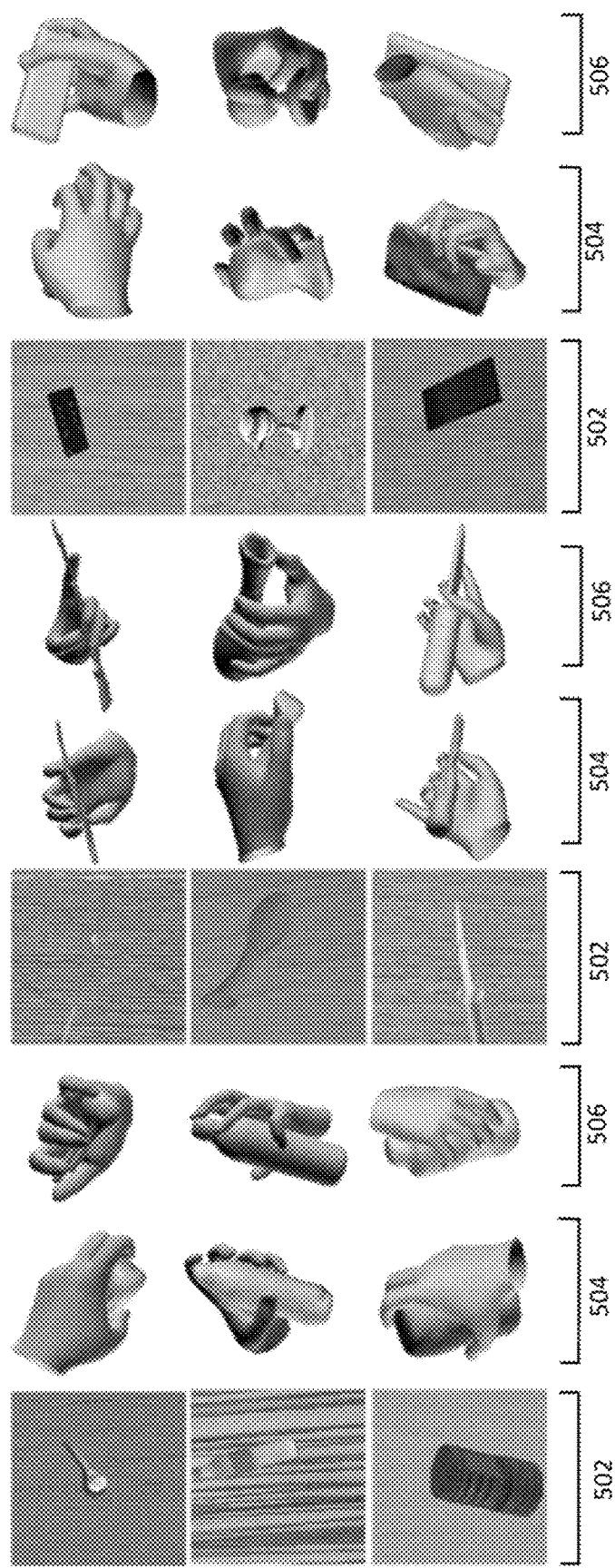
FIG. 5 illustrates an input image (left), predicted grasp when estimating the object 3D shape (middle) and when using the ground-truth object shape (right)

FIG. 5 shows, for each object in an input image, the input image 502, the predicted grasp when estimating the object 3D shape 504, and the predicted grasp when using the ground-truth object shape 506.

In Table 1, quantitative results on comparing three grasping hand models for both the disclosed method (GanHand) and the baseline method are provided. In particular the grasping hand models are obtained by evaluating both methods using optimization for 1, 2, or 3 joints. Then, the hand models having the highest grasp score are selected, which provides a good trade-off between grasp accuracy and running time. GraspIt was run on the ground-truth object shapes.

In Table 1, the characteristics of each hand model obtained are compared such that in characteristics having the symbol ↑, the higher the punctuation the better the hand model, and on having the symbol ↓, the lower the punctuation the better the hand model. Also it is highlighted that the models obtained in the simulator case are run on ground-truth object shapes.

The disclosed method has been also tested on the YCB Affordance dataset, generated for training and testing the disclosed method. The baseline method and the disclosed method were trained on 80 videos from YCB Affordance (130 k frames). Test is evaluated on a different subset of 12 videos (2949 frames) of the same objects seen at train, but different scenes and poses.

Figure 7:
FIG. 7 illustrates results on some practical cases applying the disclosed method.

FIG. 7 shows results on eight different cases. As shown, the disclosed method (GanHand) achieves a higher % of graspable objects and a higher accuracy in predicted grasp types compared to the baseline method. The plane interpenetration is considerably low for both methods, indicating that both models learnt to adequately place the hands above the tables.

Some failure cases are also highlighted in bottom row. In the case bottom left, the absolute poses of the can and clamps are not accurate and overlapping grasps are produced. In the case bottom right, the cup is detected as a brick, predicting a wrong grasp.

TABLE 2

| Model Finger joints optimized | Baseline | | | | GanHand | | | |
|---|---|---|---|---|---|---|---|---|
| | — | 1 | 2 | 3 | — | 1 | 2 | 3 |
| % graspable objects ↑ | 4 | 21 | 33 | 31 | 21 | 58 | 57 | 55 |
| Acc. grasp type % ↑ | 49 | 62 | 57 | 56 | 78 | 76 | 70 | 76 |
| Grasp score ↑ | 0.37 | 0.45 | 0.44 | 0.45 | 0.36 | 0.47 | 0.46 | 0.42 |
| Hand-Object Contacts ↑ | 3.7 | 3.7 | 3.7 | 3.7 | 3.7 | 3.7 | 3.8 | 3.9 |
| Obj. Interp. (cm3) ↓ | 38 | 30 | 30 | 30 | 26 | 27 | 28 | 26 |
| Plane interp. (cm) ↓ | 0.1 | 0.1 | 0.1 | 0.1 | 0.3 | 0.3 | 0.2 | 0.3 |

TABLE 1

| Model Finger joints optimized | Baseline | | | | GanHand | | | | GraspIt* |
|---|---|---|---|---|---|---|---|---|---|
| | — | 1 | 2 | 3 | — | 1 | 2 | 3 | — |
| Grasp score ↑ | 0.19 | 0.36 | 0.37 | 0.43 | 0.4 | 0.6 | 0.56 | 0.56 | 0.3 |
| Hand-Object Contacts ↑ | 2.6 | 4 | 4.4 | 4.6 | 3 | 3.9 | 4.4 | 4.4 | 4.4 |
| Interpenetration ↓ | 42 | 27 | 29 | 29 | 48 | 33 | 34 | 34 | 10 |
| Time (sec) ↓ | 0.2 | 0.3 | 0.3 | 0.4 | 0.2 | 0.3 | 0.3 | 0.4 | 300 |

In Table 2, quantitative results comparing three grasping hand models on YCB-Affordance dataset for both the disclosed method (GanHand) and the baseline method are provided. The overall result is that the disclosed method (GanHand) outperforms the baseline method in all metrics, except from plane interpenetration which is negligible for both methods.

In this method, up to 20 predictions are sampled and the one with least interpenetration with all predicted objects is selected. Both methods leverage the grasp variety of YCB Affordance dataset predicting a good diversity of grasps.

Also, the intended activity and the state of the object to select a more appropriate grasp may be taken into account. For instance, a human would not manipulate a cup when drinking hot liquid from it the same way when washing it.

In an implementation example, the classification module is based on a ResNet-50. The discriminator and hand pose refiner are 4-layer fully connected networks with ReLU nonlinearities and Xavier initialization.

Input images are resized to 256×256. A hyperparameter grid search is performed to maximize and train all models using LR=0.0001, BS=32, loss weights class=1, arc=0:01, cont=100, int=4000, p=20, adv=1 and gp=10 using Adam optimizer.

The Generator is trained once every 5 forward passes to improve the relative quality of the Discriminator. The model is trained for 5 epochs, and with linear LR decay for 25 epochs more.

Figure 9:
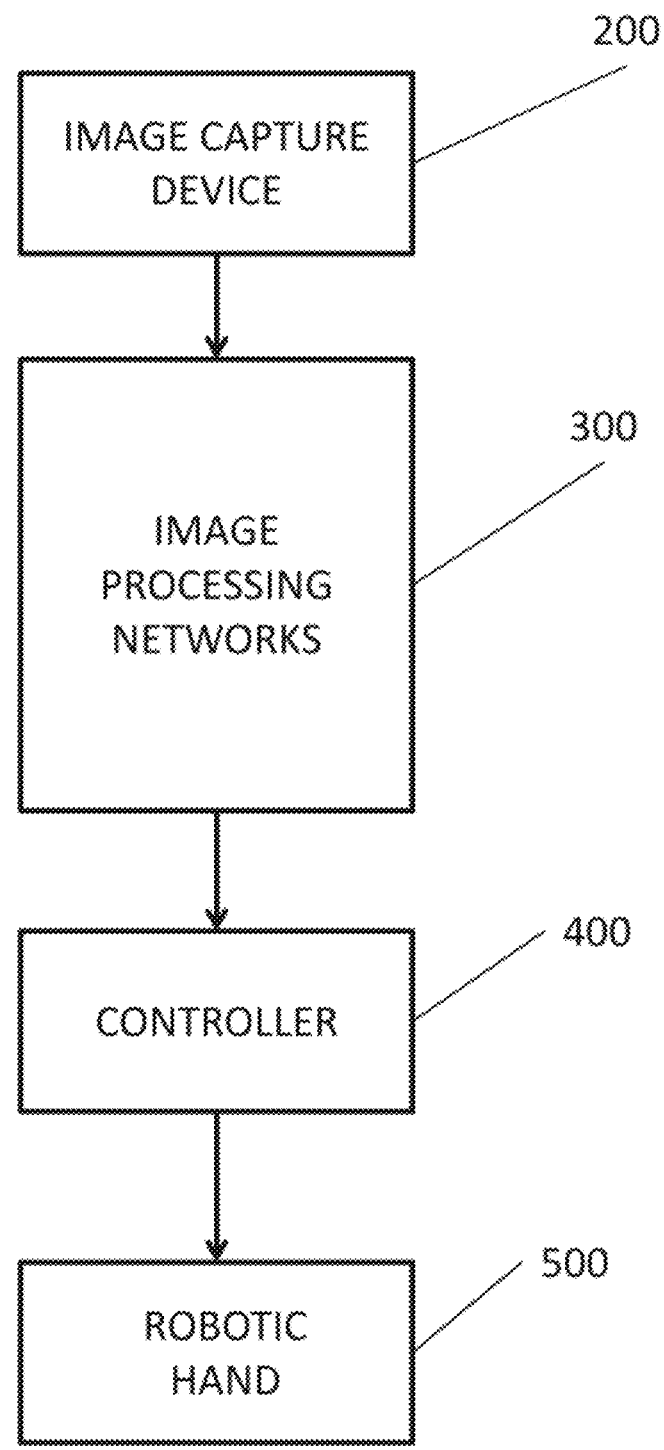
FIG. 9 is a block diagram illustrating a robotic hand system for grasping an object.

FIG. 9 illustrates a robotic hand system for grasping an object. As illustrated in FIG. 9, the robotic hand system includes an image capturing device 200 that in one embodiment is an image recording device (e.g., camera, scanner, etc.) for recording an object to create an image having an object image (image of the object) contained therein or that in an alternate embodiment is an image transceiver devices that receives (e.g., over a network) the image from an independently operating device that stores or records the image. The image obtained from the image capture device 200 is fed to image processing networks 300 to create predicted parameters of a hand model.

The image processing networks 300 includes a first neural network (not shown), operatively connected to the image capturing device, for segmenting the object image in the created image; a second neural network, operatively connected to the first neural network, for predicting parameters of a hand model that define a pose for grasping the segmented object image; and a third neural network, operatively connected to the second neural network, for refining the predicted parameters of the hand model to fit the segmented object image.

Figure 10:
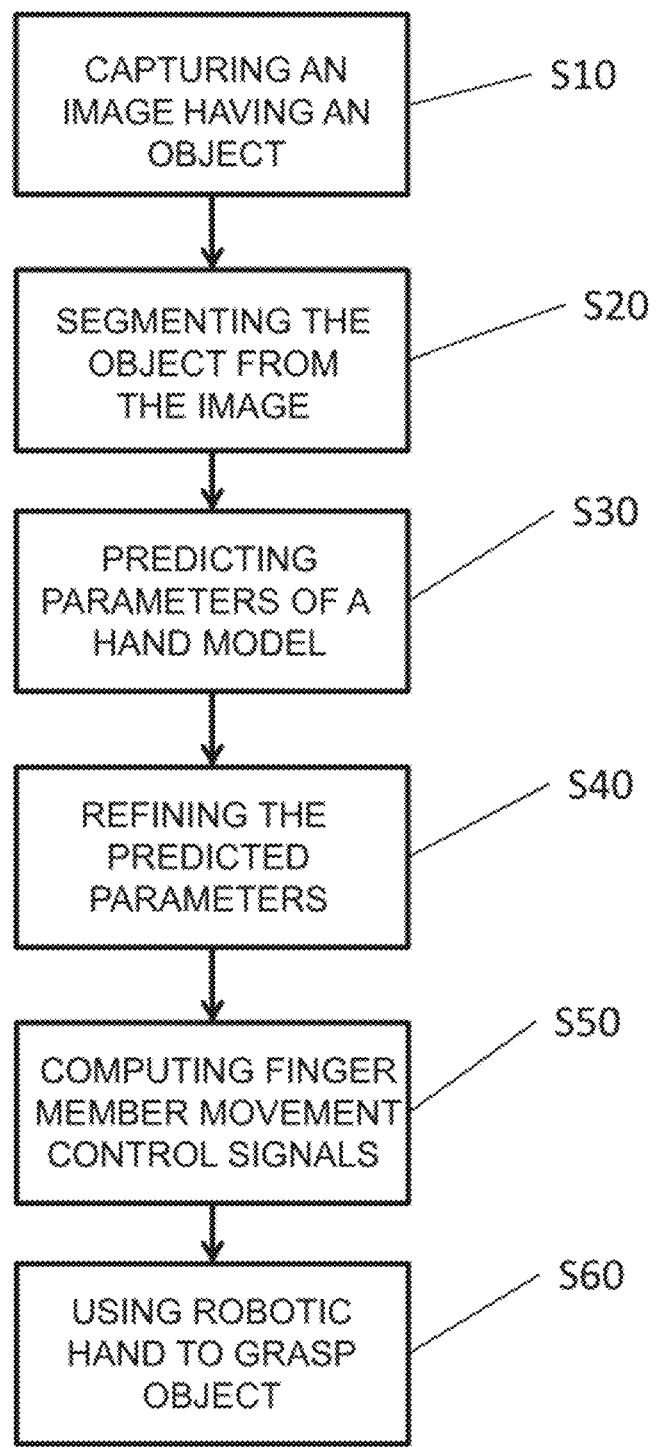
FIG. 10 is a flowchart showing a method of grasping an object with a robotic hand.

A controller 400, operatively connected to the image processing networks 300, converts the refined predicted parameters to finger member movement control signals. A robotic hand 500 having finger members, operatively connected to the controller 400, moves the finger members, in response to the finger member movement control signals, to grasp the object FIG. 10 is a flowchart showing a method of grasping an object with a robotic hand. As illustrated in FIG. 10, the method, at step S10, captures, using an image capturing device (e.g., a camera), an image having an object image contained therein. At step S20, the object image in the captured image, using a first neural network, is segmented. At step S30, parameters of a hand model that define a pose for grasping the segmented object image, using a second neural network, are predicted. At step S40, the predicted parameters of the hand model to fit the segmented object image, using a third neural network, are refined.

At step S50, the refined predicted parameters, using a controller, are used to compute finger member movement control signals. At step S60, the finger members of a robotic hand are moved, in response to the finger member movement control signals, to grasp the object.

Figure 11:
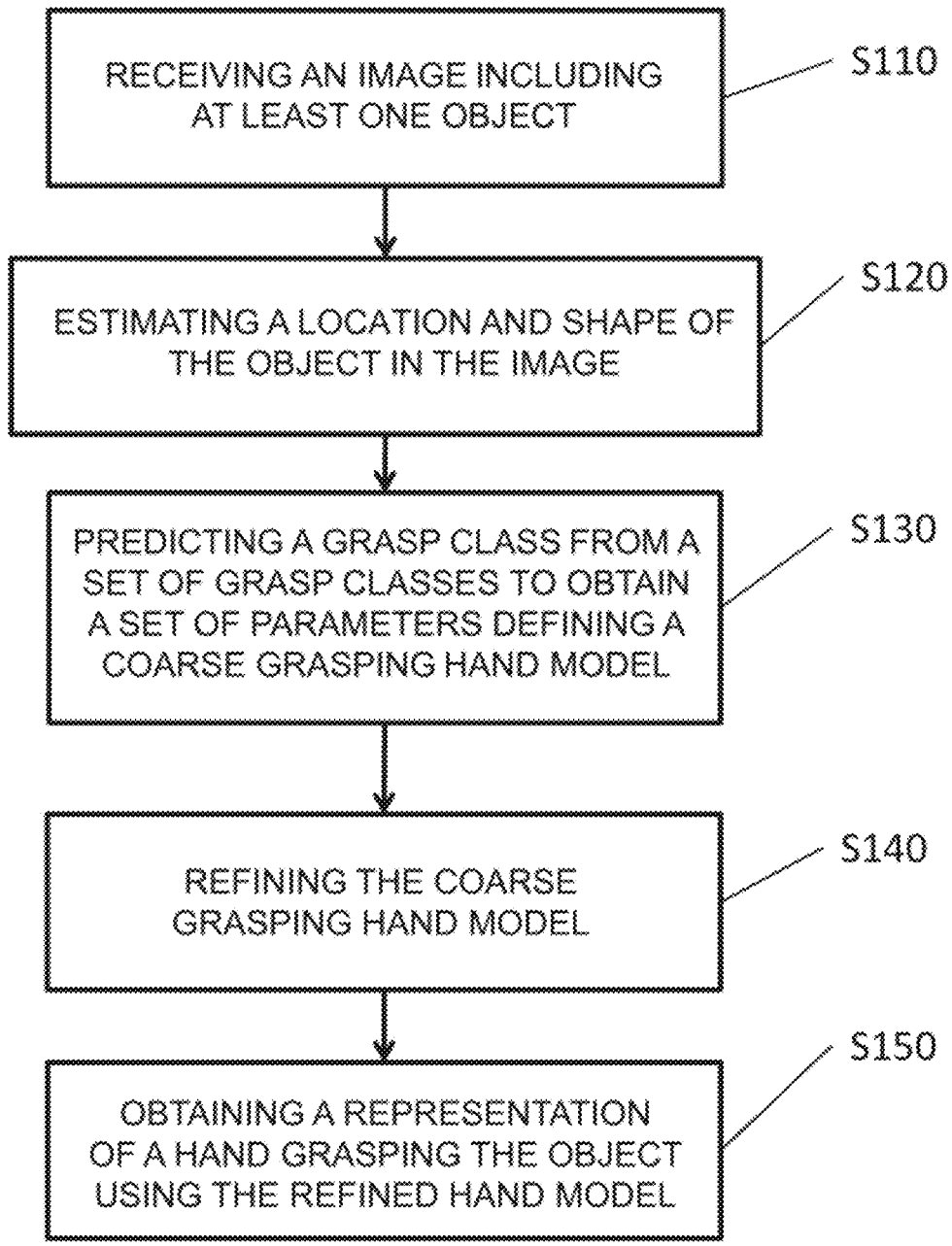
FIG. 11 is a flowchart showing a method of obtaining a representation of a hand grasping an object.

FIG. 11 is a flowchart showing a method of obtaining a representation of a hand grasping an object. As illustrated in FIG. 11, a method for determining a grasping hand model suitable for grasping an object, at step S110, receives an image including at least one object. At step S120, the method estimates a location and shape of the object in the image (which in one embodiment when the object is known is performed by the method by obtaining an object model that estimates a pose and shape).

At step S130, the method predicts a grasp class from a set of grasp classes by means of a neural network to obtain a set of parameters defining a coarse grasping hand model. The method, at step S140, refines the coarse grasping hand model, by minimizing loss functions referring to the parameters of the hand model for obtaining an operable grasping hand model while minimizing a distance between fingers of the hand model and a surface of the object and preventing interpenetration. The method, at step S150, obtains a representation of a hand grasping the object by using the refined hand model.

Figure 8:
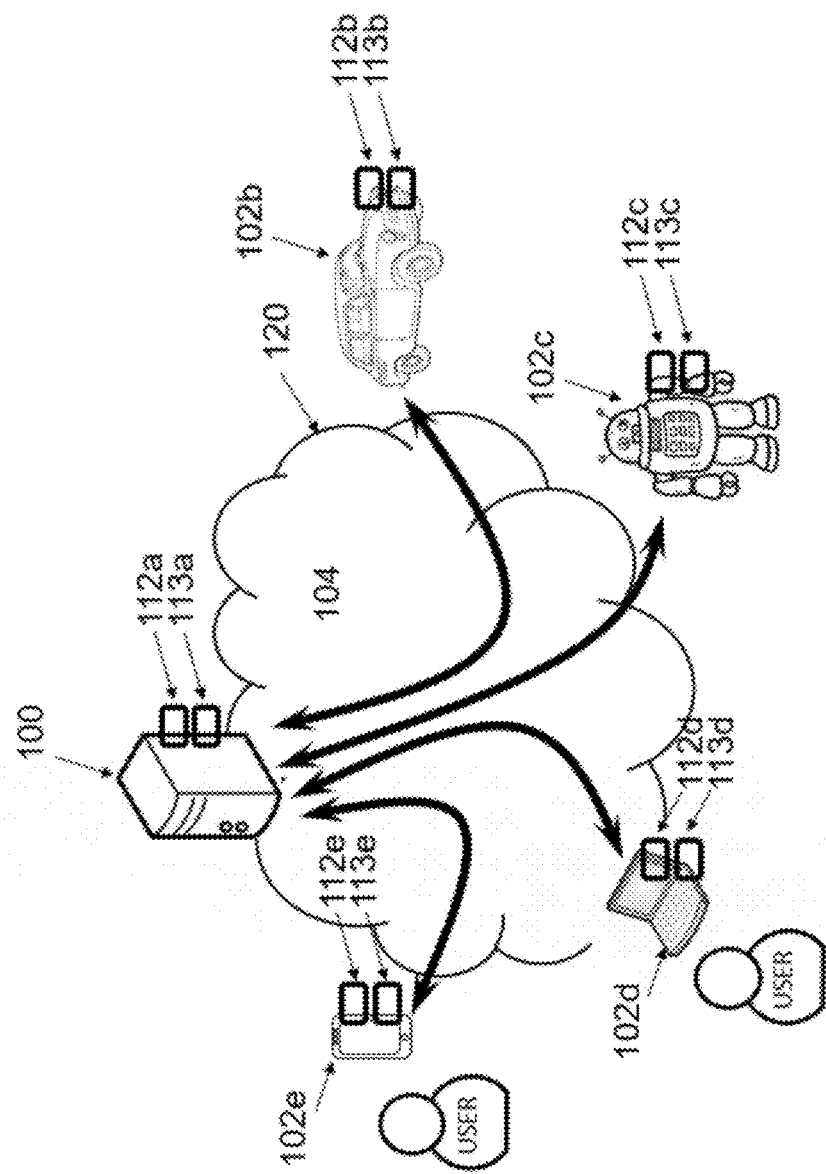
FIG. 8 illustrates an example of architecture in which the disclosed methods may be performed.

The above-mentioned methods and embodiments may be implemented within an architecture such as illustrated in FIG. 8, which comprises server 100 and one or more client devices (102b, 102c, 102d, and 102e) that communicate over a network 120 (which may be wireless and/or wired) such as the Internet for data exchange. Server 100 and the client devices (102b, 102c, 102d, and 102e) include a data processor (112a, 112b, 112c, 112d, and 112e) and memory (113a, 113b, 113c, 113d, and 113e) such as a hard disk. The client devices 102 may be any device that communicates with server 100, including autonomous vehicle 102b, robot 102c, computer 102d, or cell phone 102e.

More precisely, in one embodiment, the representation of the disclosed method illustrated in FIG. 4 may be processed at server 100 (or at a different server or alternatively directly at the client device (102b, 102c, 102d, and 102e)).

While some specific embodiments have been described in detail above (e.g., with respect to a human hand), it will be apparent to those skilled in the art that various modifications, variations, and improvements of the embodiments may be made in the light of the above teachings and within the content of the appended claims without departing from the intended scope of the embodiments (e.g., with respect to other than a human hand, such as a robot hand).

The embodiments disclosed above may be implemented as a machine (or system), process (or method), or article of manufacture by using standard programming and/or engineering techniques to produce programming software, firmware, hardware, or any combination thereof. It will be appreciated that the flow diagrams described above are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-readable media such as memory devices or transmitting devices, thereby making a computer program product or article of manufacture according to the embodiments. As such, the terms "article of manufacture" and "computer program product" as used herein are intended to encompass a computer program existent (permanently, temporarily, non-transitorily, or transitorily) on any computer-readable medium such as on any memory device or in any transmitting device.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the embodiments as set forth in the claims.

Those skilled in the art will recognize that memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other wired or wireless network systems/communication links.

A method for determining a grasping hand model suitable for grasping an object, the method comprises: (a) obtaining at least one image including at least one object; (b) estimating a location and shape of the object from the first image of the object; (c) predicting, using the estimated location and shape, a grasp taxonomy from a set of grasp taxonomies by means of a neural network, thus, obtaining a set of parameters defining a coarse grasping hand model; (d) refining the coarse grasping hand model, by minimizing loss functions referring to the parameters of the hand model for obtaining an operable grasping hand model while minimizing the distance between the fingers of the hand model and the surface of the object and preventing interpenetration; and (e) obtaining a representation of a hand grasping the object using the refined hand model.

The neural network may be a Convolutional Neural Network, with a cross entropy loss $L_{class}$ defined as:

$$L_{class} = \Sigma_{c \in K} C_{o,c} \log(1 - P_{o,c});$$

wherein C represents a grasp type for the particular object (o), c represents the grasp classes among the K possible grasps classes, and P represents pose predictions for the particular object (o)

The representation obtained in (e) may be a mesh of the refined hand model.

The hand model may be represented by using a MANO model, being a 51 degrees of freedom (DoF) model of a possible human hand.

The method may further include (f) evaluating the grasping hand model obtained by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

The method may further include (f) randomly rotating the object model; (g) obtaining a grasping hand model for each rotated object model; (h) evaluating each rotated grasping hand model using evaluating metrics; and (i) selecting the rotated grasping hand models having the highest score.

The estimating a pose and shape of the object may comprise an object reconstruction phase for obtaining a cloud of points representing the object form the obtained image.

The RGB image may comprise more than one object and the method further comprises the step of repeating (b) to (e) for each object in the image, wherein the objects are known.

The selecting a grasp taxonomy may comprise a phase of predicting an increment of translation and rotation of the hand model and a modified coarse configuration of the hand model by means of a fully connected network.

The refining the coarse grasping model may comprise (d1) selecting at least one articulation (i) of the hand model; (d2) calculating an arc (Ai) between a finger (j) of the hand model and close object vertices (O), $D_\theta \leftarrow \min_i(\min_k(\|A_i^\theta, O_k\|_2))$; (d3) estimating the angle the finger needs to be rotated to collide with the object, rotating the articulation for minimizing the arc, thus, reducing the distance between the hand model and the object vertices, including a hyperparameter for controlling the interpenetration of the hand model into the object, $\gamma_j' \leftarrow \arg\min_\theta D_\theta + \delta$, $\forall \theta$ s.t. $D_\theta < t_d$; (d5) defining the following loss functions:

$$L_{arc} = \frac{1}{|J|} \sum_{j \in J} D_\theta^j \quad L_\gamma \leftarrow \sum_j^J \|\gamma_j' - \gamma_j\|_2;$$

and (d6) minimizing the loss functions defined.

The refining the coarse grasping model may comprise repeating phases (d2) to (d3) for each articulation sequentially from the knuckle to the tip for each finger.

The refining the coarse grasping model may further comprise minimizing a loss function selected from: a distance between the hand vertices and the target object, wherein is considered that there is a contact when the distance is below to 2 mm, defined by:

$$L_{cont} = \frac{1}{|V_{cont}|} \sum_{v \in V_{cont}} \min_k \|v, O_k^j\|_2;$$

a distance of interpenetration between a vertex of the hand model and the object, defined by:

$$L_{int} = \frac{1}{|V_i|} \sum_j^{|O|} \sum_{v \in V_i} \min_k \|v, O_k^j\|_2$$

; a distance below a table plane, between a vertex of the hand model and the table plane, wherein the distance is favored to be positive, defined by: $L_p = \Sigma_v^v \min(0, |(v-p_p) \cdot v_p|)$; and an adversarial loss function, using a Wasserstein loss including a gradient penalty loss, defined by: $L_{adv} = -E_{H,R,T \sim p(H,R,T)}[D(G(I))] + E_{H,R,T \sim p(H,R,T)}[D(H^*, R^*, T^*)]$.

The hand may be a human hand.

A system for determining parameters of a model of a hand suitable for grasping an object, comprises a first neural network for segmenting the object in an image and estimating a 3D shape of the segmented object; a second neural network for predicting parameters of the model of the hand that define a pose for grasping the segmented object; and a third neural network for refining the predicted parameters of the model of the hand to fit the segmented object.

The hand may be a human hand.

A method for determining parameters of a model of a hand suitable for grasping an object, comprises segmenting with a first neural network the object in an image and estimating a 3D shape of the segmented object; predicting with a second neural network parameters of the model of the hand that define a pose for grasping the segmented object; and refining with a third neural network the predicted parameters of the model of the hand to fit the segmented object.

The hand may be a human hand.

A computer program product non-transitorily existent on a computer-readable media for determining a grasping hand model suitable for grasping an object comprising code instructions, when the computer program product is executed on a computer, to execute a method for determining a grasping hand model suitable for grasping an object; the code instructions, when determining a grasping hand model suitable for grasping an object, (a) obtains at least one image including at least one object, (b) obtaining an object model estimating a pose and shape of the object from the first image of the object, (c) predicts a grasp taxonomy from a set of grasp taxonomies by means of a neural network, thus, obtaining a set of parameters defining a coarse grasping hand model, (d) refines the coarse grasping hand model, by minimizing loss functions referring to the parameters of the hand model for obtaining an operable grasping hand model while minimizing the distance between the fingers of the hand model and the surface of the object and preventing interpenetration, and (e) obtains a representation of a hand grasping the object by using the refined hand model.

A non-transitory computer-readable media, on which is stored a computer program product, comprises code instructions, when the computer program product is executed on a computer, to execute a method for determining a grasping hand model suitable for grasping an object; the code instructions, when determining a grasping hand model suitable for grasping an object, (a) obtains at least one image including at least one object, (b) obtaining an object model estimating a pose and shape of the object from the first image of the object, (c) predicts a grasp taxonomy from a set of grasp taxonomies by means of a neural network, thus, obtaining a set of parameters defining a coarse grasping hand model, (d) refines the coarse grasping hand model, by minimizing loss functions referring to the parameters of the hand model for obtaining an operable grasping hand model while minimizing the distance between the fingers of the hand model and the surface of the object and preventing interpenetration, and (e) obtains a representation of a hand grasping the object by using the refined hand model.

A method for determining a grasping hand model suitable for grasping an object, the method comprises (a) receiving an image including at least one object; (b) estimating a location and shape of the object from the image of the object; (c) predicting, using the estimated location and shape, a grasp class from a set of grasp classes by means of a neural network to obtain a set of parameters defining a coarse grasping hand model; (d) refining the coarse grasping hand model, by minimizing loss functions referring to the parameters of the hand model for obtaining an operable grasping hand model while minimizing a distance between fingers of the hand model and a surface of the object and preventing interpenetration; and (e) obtaining a representation of a hand grasping the object using the refined hand model.

The neural network may be a Convolutional Neural Network, with a cross entropy loss $L_{class}$ defined as $L_{class} = \Sigma_{c \in K} C_{o,c} \log(1 - P_{o,c})$; wherein C represents a grasp type for the particular object (o), c represents the grasp classes among the K possible grasps classes, and P represents pose predictions for the particular object (o).

The representation obtained in (e) may be a mesh of the refined hand model.

The hand model may be represented by using a MANO model, being a 51 degrees of freedom model of a possible human hand.

The method may further comprise (f) evaluating the grasping hand model obtained by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

The method may further comprise (f) obtaining an object model for estimating a pose and a shape of the object from the image of the object; (g) randomly rotating the object model; (h) obtaining a grasping hand model for each rotated object model; (i) evaluating each rotated grasping hand model using evaluating metrics; and (j) selecting the rotated grasping hand models having the highest score and The estimating a pose and shape of the object may comprise an object reconstruction phase for obtaining a cloud of points representing the object form the obtained image.

The image may comprise more than one object and the method further comprises the step of repeating (b) to (e) for each object in the image, wherein the objects are known.

The predicting a grasp class may further comprise a phase of predicting an increment of translation and rotation of the hand model and a modified coarse configuration of the hand model by means of a fully connected network.

The refining the coarse grasping model may comprise (d1) selecting at least one articulation (i) of the hand model; (d2) calculating an arc (Ai) between a finger (j) of the hand model and close object vertices (O), $D_\theta \leftarrow \min_i(\min_k(\|A_i^\theta, O_k\|_2))$; (d3) estimating the angle the finger needs to be rotated to collide with the object, rotating the articulation for minimizing the arc, thus, reducing the distance between the hand model and the object vertices, including a hyperparameter for controlling the interpenetration of the hand model into the object, $\gamma_j' \leftarrow \arg \min_\theta D_\theta + \delta, \forall \theta \text{ s.t. } D_\theta < t_d$; (d4) defining the following loss functions:

$$L_{arc} = \frac{1}{|J|}\sum_{j \in J} D_\theta^j \quad L_\gamma \leftarrow \sum_j^J \|\gamma_j' - \gamma_j\|_2 ;$$

and (d5) minimizing the loss functions defined.

The refining the coarse grasping model may further comprise repeating phases (d2) and (d3) for each articulation sequentially from the knuckle to the tip for each finger.

The refining the coarse grasping model may include minimizing a loss function from a distance between the hand vertices and the target object, wherein is considered that there is a contact when the distance is below to 2 mm, defined by $$L_{cont} = \frac{1}{|V_{cont}|} \sum_{v \in V_{cont}} \min_k \|v, O_k^t\|_2.$$

The refining the coarse grasping model may include minimizing a loss function from a distance of interpenetration between a vertex of the hand model and the object, defined by $$L_{int} = \frac{1}{|V_i|} \sum_j^{|O|} \sum_{v \in V_i} \min_k \|v, O_k^j\|_2.$$

The refining the coarse grasping model may include minimizing a loss function from a distance below a table plane, between a vertex of the hand model and the table plane, wherein the distance is favored to be positive, defined by $L_p = \Sigma_v^v \min(0, |(v-p_p) \cdot v_p|)$.

The refining the coarse grasping model may include minimizing a loss function from an adversarial loss function, using a Wasserstein loss including a gradient penalty loss, defined by $L_{adv} = -E_{H,R,T \sim p(H,R,T)}[D(G(I))] + E_{H,R,T \sim p(H,R,T)}[D(H^*, R^*, T^*)]$.

The hand may be a human hand.

A system for determining parameters of a hand model suitable for grasping an object, comprises a first neural network for segmenting the object in an image; a second neural network for predicting parameters of the hand model that define a pose for grasping the segmented object; and a third neural network for refining the predicted parameters of the hand model to fit the segmented object; wherein the predicted parameters of the hand model represent how a hand may grasp the object.

The first neural network may segment the object in an image by estimating a pose and a 3D shape of the object from the image of the object.

The second neural network may predict parameters of the hand model by predicting a grasp class from a set of grasp classes to obtain a set of parameters defining a coarse grasping hand model.

The third neural network may refine the predicted parameters of the hand model by minimizing loss functions referring to the parameters of the hand model for obtaining an operable grasping hand model while minimizing a distance between the fingers of the hand model and a surface of the object and preventing interpenetration.

The second neural network may be a Convolutional Neural Network, with a cross entropy loss $L_{class}$ defined as: $L_{class} = \Sigma_{c \in K} C_{o,c} \log(1 - P_{o,c})$; wherein C represents a grasp type for the particular object (o), c represents the grasp classes among the K possible grasps classes, and P represents pose predictions for the particular object (o).

The third neural network may obtain a representation of a hand grasping the object by using the refined predicted parameters of the hand model, the representation being a mesh of the refined hand model.

The third neural network may use a MANO model, being a 51 degrees of freedom model of a possible human hand, for refining the predicted parameters of the hand model.

The third neural network may evaluate the grasping hand model by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

The third neural network may (a) randomly rotate an object model; (b) obtain a grasping hand model for each rotated object model; (c) evaluate each rotated grasping hand model using evaluating metrics; and (d) select the rotated grasping hand models having the highest score.

The second neural network may estimate a pose and shape of the object by using an object reconstruction phase for obtaining a cloud of points representing the object form the obtained image.

The image may include more than one object; the first neural network segmenting each object in the image and estimating a 3D shape of each segmented object; the second neural network predicting parameters of the hand model that define a pose for grasping each segmented object; the third neural network refining the predicted parameters of the hand model to fit each segmented object.

The second neural network may select a grasp class by utilizing a phase of predicting an increment of translation and rotation of the hand model and a modified coarse configuration of the hand model.

The third neural network may refine the coarse grasping model by (a) selecting at least one articulation (i) of the hand model; (b) calculating an arc (Ai) between a finger (j) of the hand model and close object vertices (O), $D_\theta \leftarrow \min_i(\min_k(\|A_i^\theta, O_k\|_2))$; (c) estimating the angle the finger needs to be rotated to collide with the object, rotating the articulation for minimizing the arc, thus, reducing the distance between the hand model and the object vertices, including a hyperparameter for controlling the interpenetration of the hand model into the object, $\gamma_j' \leftarrow \arg \min_\theta D_\theta + \delta, \forall \theta \text{ s.t. } D_\theta < t_d$; (d) defining the following loss functions:

$$L_{arc} = \frac{1}{|J|} \sum_{j \in J} D_\theta^j \quad L_\gamma \leftarrow \sum_j^J \|\gamma_j' - \gamma_j\|_2;$$

and (e) minimizing the loss functions defined.

The third neural network may refine the coarse grasping model for each articulation sequentially from the knuckle to the tip for each finger.

The third neural network may refine the coarse grasping model by minimizing a loss function from a distance between the hand vertices and the target object, wherein is considered that there is a contact when the distance is below to 2 mm, defined by $$L_{cont} = \frac{1}{|V_{cont}|} \sum_{v \in V_{cont}} \min_k \|v, O_k^t\|_2.$$

The third neural network may refine the coarse grasping model by minimizing a loss function from a distance of interpenetration between a vertex of the hand model and the object, defined by $$L_{int} = \frac{1}{|V_i|}\sum_j^{|O|} \sum_{v \in V_i} \min_k \|v, O_k^j\|_2.$$

The third neural network may refine the coarse grasping model by minimizing a loss function from a distance below a table plane, between a vertex of the hand model and the table plane, wherein the distance is favored to be positive, defined by $L_p = \Sigma_v^v \min(0, |(v-p_p)\cdot v_p|)$.

The third neural network may refine the coarse grasping model by minimizing a loss function from an adversarial loss function, using a Wasserstein loss including a gradient penalty loss, defined by $L_{adv} = -E_{H,R,T \sim p(H,R,T)}[D(G(I))] + E_{H,R,T \sim p(H,R,T)}[D(H^*, R^*, T^*)]$.

The hand may be a human hand.

A method for determining parameters of a hand model suitable for grasping an object, comprises (a) receiving an object segmented in an image; (b) predicting, with a first neural network, parameters of the hand model that define a pose for grasping the segmented object; and (c) refining, with a second neural network, the predicted parameters of the hand model to fit the segmented object; wherein the predicted parameters of the hand model represent how a hand may grasp the object.

The receiving may be performed using a third neural network.

The method may segment an object in an image by estimating a pose and shape of the object from the image of the object.

The method may predict parameters of the hand model by predicting a grasp class from a set of grasp classes to obtain a set of parameters defining a coarse grasping hand model.

The method may refine the predicted parameters of the hand model by minimizing loss functions referring to the parameters of the hand model for obtaining an operable grasping hand model while minimizing the distance between the fingers of the hand model and the surface of the object and preventing interpenetration.

The method may further comprise (d) obtaining a representation of a hand grasping the object by using the refined hand model.

The first neural network may be a Convolutional Neural Network, with a cross entropy loss $L_{class}$ defined as: $L_{class} = \Sigma_{c \in K} C_{o,c} \log(1-P_{o,c})$; wherein C represents a grasp type for the particular object (o), c represents the grasp classes among the K possible grasps classes, and P represents pose predictions for the particular object (o).

The obtained representation may be a mesh of the refined hand model.

The hand model may be represented by using a MANO model, being a 51 degrees of freedom model of a possible human hand.

The method may further comprise (e) evaluating the grasping hand model obtained by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

The method may further comprise (f) randomly rotating an object model; (g) obtaining a grasping hand model for each rotated object model; (h) evaluating each rotated grasping hand model using evaluating metrics; and (i) selecting the rotated grasping hand models having the highest score.

The estimating of a pose and shape of the object may comprise an object reconstruction phase for obtaining a cloud of points representing the object form the obtained image.

The image may comprise more than one object and the method further comprises the step of repeating (a) to (c) for each object in the image, wherein the objects are known.

The method may select a grasp class by utilizing a phase of predicting an increment of translation and rotation of the hand model and a modified coarse configuration of the hand model.

The method may include (c1) selecting at least one articulation (i) of the hand model; (c2) calculating an arc (Ai) between a finger (j) of the hand model and close object vertices (O), $D_\theta \leftarrow \min_i(\min_k(\|A_i^\theta, O_k\|_2))$; (c3) estimating the angle the finger needs to be rotated to collide with the object, rotating the articulation for minimizing the arc, thus, reducing the distance between the hand model and the object vertices, including a hyperparameter for controlling the interpenetration of the hand model into the object, $\gamma_j' \leftarrow \arg\min_\theta D_\theta + \delta$, $\forall \theta$ s.t. $D_\theta < t_d$; (c4) defining the following loss functions:

$$L_{arc} = \frac{1}{|J|}\sum_{j \in J} D_\theta^j \quad L_\gamma \leftarrow \sum_j^J \|\gamma_j' - \gamma_j\|_2 ;$$

and (c5) minimizing the loss functions defined.

The method may further include repeating phases (c2) and (c3) for each articulation sequentially from the knuckle to the tip for each finger.

The method may further comprise minimizing a loss function from a distance between the hand vertices and the target object, wherein is considered that there is a contact when the distance is below to 2 mm, defined by $$L_{cont} = \frac{1}{|V_{cont}|}\sum_{v \in V_{cont}} \min_k \|v, O_k^j\|_2.$$

The method may further comprise minimizing a loss function from a distance of interpenetration between a vertex of the hand model and the object, defined by $$L_{int} = \frac{1}{|V_i|}\sum_j^{|O|} \sum_{v \in V_i} \min_k \|v, O_k^j\|_2.$$

The method may further comprise minimizing a loss function from a distance below a table plane, between a vertex of the hand model and the table plane, wherein the distance is favored to be positive, defined by $L_p = \Sigma_v^v \min(0, |(v-p_p)\cdot v_p|)$.

The method may further comprise minimizing a loss function from an adversarial loss function, using a Wasserstein loss including a gradient penalty loss, defined by
$L_{adv} = -E_{H,R,T \sim p(H,R,T)}[D(G(I))] + E_{H,R,T \sim p(H,R,T)}[D(H^*, R^*, T^*)]$.

The hand may be a human hand.

A robotic system for grasping an object with a robotic hand, comprises an image capturing device for creating an image having an object image contained therein; a first neural network, operatively connected to the image capturing device, for segmenting the object image in the created image; a second neural network, operatively connected to the first neural network, for predicting parameters of a hand model that define a pose for grasping the segmented object image; a third neural network, operatively connected to the second neural network, for refining the predicted parameters of the hand model to fit the segmented object image; a controller, operatively connected to the third neural network, for converting the refined predicted parameters to finger member movement control signals; and a robotic hand having finger members, operatively connected to the controller, to move the finger members, in response to the finger member movement control signals, to grasp the object.

The first neural network may segment the object image in the image by estimating a pose and a 3D shape of the object from the object image.

The second neural network may predict parameters of the hand model by predicting a grasp class from a set of grasp classes to obtain a set of parameters defining a coarse grasping hand model.

The third neural network may refine the predicted parameters of the hand model by minimizing loss functions referring to the parameters of the hand model for obtaining an operable grasping hand model while minimizing a distance between fingers of the hand model and a surface of the object and preventing interpenetration.

The second neural network may be a Convolutional Neural Network, with a cross entropy loss $L_{class}$ defined as: $L_{class} = \Sigma_{c \in K} C_{o,c} \log(1 - P_{o,c})$; wherein C represents a grasp type for the particular object (o), c represents the grasp classes among the K possible grasps classes, and P represents pose predictions for the particular object (o).

The third neural network may obtain a representation of a hand grasping the object by using the refined predicted parameters of the hand model, the representation being a mesh of the refined hand model.

The third neural network may use a MANO model, being a 51 degrees of freedom model of a possible human hand, for refining the predicted parameters of the hand model.

The third neural network may evaluate the grasping hand model by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

The third neural network may (a) randomly rotate an object model; (b) obtain a grasping hand model for each rotated object model; (c) evaluate each rotated grasping hand model using evaluating metrics; and (d) select the rotated grasping hand models having the highest score.

The second neural network may estimate a pose and shape of the object by using an object reconstruction phase for obtaining a cloud of points representing the object form the obtained image.

The image may include more than one object image; the first neural network segmenting each object image in the image and estimating a 3D shape of each segmented object image; the second neural network predicting parameters of the hand model that define a pose for grasping each segmented object image; the third neural network refining the predicted parameters of the hand model to fit each segmented object image.

The second neural network may select a grasp class by utilizing a phase of predicting an increment of translation and rotation of the hand model and a modified coarse configuration of the hand model.

The third neural network may refines the coarse grasping model by (a) selecting at least one articulation (i) of the hand model; (b) calculating an arc (Ai) between a finger (j) of the hand model and close object vertices (O), $D_\theta \leftarrow \min_i(\min_k(\|A_i^\theta, O_k\|_2))$; (c) estimating the angle the finger needs to be rotated to collide with the object, rotating the articulation for minimizing the arc, thus, reducing the distance between the hand model and the object vertices, including a hyperparameter for controlling the interpenetration of the hand model into the object, $\gamma_j' \leftarrow \arg\min_\theta D_\theta + \delta$, $\forall \theta \text{ s.t. } D_\theta < t_d$; (d) defining the following loss functions:

$$L_{arc} = \frac{1}{|J|} \sum_{j \in J} D_\theta^j \quad L_\gamma \leftarrow \sum_j^J \|\gamma_j' - \gamma_j\|_2;$$

and (e) minimizing the loss functions defined.

The third neural network may refine the coarse grasping model for each articulation sequentially from the knuckle to the tip for each finger.

The third neural network may refine the coarse grasping model by minimizing a loss function from a distance between the hand vertices and the target object, wherein is considered that there is a contact when the distance is below to 2 mm, defined by $$L_{cont} = \frac{1}{|V_{cont}|} \sum_{v \in V_{cont}} \min_k \|v, O_k^i\|_2.$$

The third neural network may refine the coarse grasping model by minimizing a loss function from a distance of interpenetration between a vertex of the hand model and the object, defined by $$L_{int} = \frac{1}{|V_i|} \sum_j^{|O|} \sum_{v \in V_i} \min_k \|v, O_k^j\|_2.$$

The third neural network may refine the coarse grasping model by minimizing a loss function from a distance below a table plane, between a vertex of the hand model and the table plane, wherein the distance is favored to be positive, defined by $L_p = \Sigma_v^v \min(0, |(v - p_p) \cdot v_p|)$.

The third neural network may refine the coarse grasping model by minimizing a loss function from an adversarial loss function, using a Wasserstein loss including a gradient penalty loss, defined by $L_{adv}=-E_{H,R,T\sim p(H,R,T)}[D(G(I))]+E_{H,R,T\sim p(H,R,T)[D(H^*,\ R^*,T^*)]}$.

The hand may be a human hand.

A method for grasping an object with a robotic hand, comprises (a) obtaining an image having an object image contained therein; (b) segmenting, using a first neural network, the object image in the created image; (c) predicting, using a second neural network, parameters of a hand model that define a pose for grasping the segmented object image; (d) refining, using a third neural network, the predicted parameters of the hand model to fit the segmented object image; (e) converting, using a controller, the refined predicted parameters to finger member movement control signals; and (f) moving finger members of a robotic hand, in response to the finger member movement control signals, to grasp the object.

The method may segment the object image by estimating a pose and shape of the object from the object image.

The method may predict parameters of the hand model by predicting a grasp class from a set of grasp classes to obtain a set of parameters defining a coarse grasping hand model.

The method may refine the predicted parameters of the hand model by minimizing loss functions referring to the parameters of the hand model for obtaining an operable grasping hand model while minimizing the distance between the fingers of the hand model and the surface of the object and preventing interpenetration.

The method may further comprise (g) obtaining a representation of a hand grasping the object by using the refined hand model.

The second neural network may be a Convolutional Neural Network, with a cross entropy loss $L_{class}$ defined as: $L_{class}=\Sigma_{c\in K} C_{o,c} \log(1-P_{o,c})$; wherein C represents a grasp type for the particular object (o), c represents the grasp classes among the K possible grasps classes, and P represents pose predictions for the particular object (o).

The obtained representation may be a mesh of the refined hand model.

The hand model may be represented by using a MANO model, being a 51 degrees of freedom model of a possible human hand.

The method may further comprise (h) evaluating the grasping hand model obtained by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

The method may further comprise (i) randomly rotating an object model; (j) obtaining a grasping hand model for each rotated object model; (k) evaluating each rotated grasping hand model using evaluating metrics; and (I) selecting the rotated grasping hand models having the highest score.

The estimating of a pose and shape of the object may comprise an object reconstruction phase for obtaining a cloud of points representing the object form the obtained image.

The image may comprise more than one object and the method further comprises the step of repeating (a) to (c) for each object in the image, wherein the objects are known.

The method may select a grasp class by utilizing a phase of predicting an increment of translation and rotation of the hand model and a modified coarse configuration of the hand model.

The method may include (d1) selecting at least one articulation (i) of the hand model; (d2) calculating an arc (Ai) between a finger (j) of the hand model and close object vertices (O), $D_\theta \leftarrow \min_i(\min_k(\|A_i^\theta, O_k\|_2))$; (d3) estimating the angle the finger needs to be rotated to collide with the object, rotating the articulation for minimizing the arc, thus, reducing the distance between the hand model and the object vertices, including a hyperparameter for controlling the interpenetration of the hand model into the object, $\gamma_j' \leftarrow \arg\min_\theta D_\theta + \delta, \forall \theta \text{s.t.} D_\theta < t_d$; (d4) defining the following loss functions:

$$L_{arc} = \frac{1}{|J|}\sum_{j\in J} D_\theta^j \quad L_\gamma \leftarrow \sum_j^J \|\gamma_j' - \gamma_j\|_2;$$

and (d5) minimizing the loss functions defined.

The method may further include repeating phases (d2) and (d3) for each articulation sequentially from the knuckle to the tip for each finger.

The method may further comprise minimizing a loss function from a distance between the hand vertices and the target object, wherein is considered that there is a contact when the distance is below to 2 mm, defined by $$L_{cont} = \frac{1}{|V_{cont}|}\sum_{v\in V_{cont}} \min_k \|v, O_k^i\|_2.$$

The method may further comprise minimizing a loss function from a distance of interpenetration between a vertex of the hand model and the object, defined by $$L_{int} = \frac{1}{|V_i|}\sum_j^{|O|} \sum_{v\in V_i} \min_k \|v, O_k^j\|_2.$$

The method may further comprise rises minimizing a loss function from a distance below a table plane, between a vertex of the hand model and the table plane, wherein the distance is favored to be positive, defined by $L_p=\Sigma_v^v \min(0, |(v-p_p)\cdot v_p|)$.

The method may further comprise minimizing a loss function from an adversarial loss function, using a Wasserstein loss including a gradient penalty loss, defined by $L_{adv}=-E_{H,R,T\sim p(H,R,T)}[D(G(I))]+E_{H,R,T\sim p(H,R,T)}[D(H^*,R^*,T^*)]$.

The hand may be a human hand.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A system for determining parameters of a hand model suitable for grasping an object, comprising:
 a first neural network for segmenting the object in an image;

a second neural network for predicting parameters of the hand model that define a pose for grasping the segmented object; and a third neural network for refining the predicted parameters of the hand model to fit the segmented object by maximizing a number of contact points between the object in the image and the hand model while minimizing interpenetration;

wherein the refined predicted parameters of the hand model represent how a hand may grasp the object.

2. The system according to claim 1, wherein said first neural network segments the object in an image by estimating a pose and a 3D shape of the object from the image of the object.

3. The system according to claim 1, wherein said second neural network predicts parameters of the hand model by predicting a grasp class from a set of grasp classes to obtain a set of parameters defining a coarse grasping hand model.

4. The system according to claim 1, wherein said third neural network refines the predicted parameters of the hand model by minimizing loss functions referring to the parameters of the hand model for obtaining an operable grasping hand model while minimizing a distance between the fingers of the hand model and a surface of the object and preventing interpenetration.

5. The system according to claim 1, wherein said second neural network is a Convolutional Neural Network, with a cross entropy loss $L_{class}$ defined as:

$$L_{class} = \Sigma_{c \in K} C_{o,c} \log(1-P_{o,c})$$

wherein C represents a grasp type for the particular object (o), c represents the grasp classes among the K possible grasps classes, and P represents pose predictions for the particular object (o).

6. The system according to claim 1, wherein said third neural network obtains a representation of a hand grasping the object by using the refined predicted parameters of the hand model, the representation being a mesh of the refined hand model.

7. The system according to claim 1, wherein said third neural network uses a MANO model, being a 51 degrees of freedom model of a possible human hand, for refining the predicted parameters of the hand model.

8. The system according to claim 1, wherein said third neural network evaluates the grasping hand model by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

9. The system according to claim 8, wherein said third neural network (a) randomly rotates an object model; (b) obtains a grasping hand model for each rotated object model; (c) evaluates each rotated grasping hand model using evaluating metrics; and (d) selects the rotated grasping hand models having the highest score.

10. The system according to claim 1, wherein said second neural network estimates a pose and shape of the object by using an object reconstruction phase for obtaining a cloud of points representing the object form the obtained image.

11. The system according to claim 1, wherein said image includes more than one object;

said first neural network segmenting each object in said image and estimating a 3D shape of each segmented object;

said second neural network predicting parameters of the hand model that define a pose for grasping each segmented object;

said third neural network refining the predicted parameters of the hand model to fit each segmented object.

12. The system according to claim 1, wherein said second neural network selects a grasp class by utilizing a phase of predicting an increment of translation and rotation of the hand model and a modified coarse configuration of the hand model.

13. The system according to claim 1, wherein said third neural network refines the coarse grasping model by:

(a) selecting at least one articulation (i) of the hand model;

(b) calculating an arc (Ai) between a finger (j) of the hand model and close object vertices (O), $$D_\theta \leftarrow \min_i(\min_k(\|A_i^\theta, O_k\|_2))$$

(c) estimating the angle the finger needs to be rotated to collide with the object, rotating the articulation for minimizing the arc, thus, reducing the distance between the hand model and the object vertices, including a hyperparameter for controlling the interpenetration of the hand model into the object, $$\gamma_j' \leftarrow \arg\min_\theta D_\theta + \delta, \ \forall \theta s.t. \ D_\theta < t_d$$

(d) defining the following loss functions:

$$L_{arc} = \frac{1}{|J|}\sum_{j \in J} D_\theta^j \quad L_\gamma \leftarrow \sum_j^J \|\gamma_j' - \gamma_j\|_2;$$

and (e) minimizing the loss functions defined.

14. The system according to claim 13, wherein said third neural network refines the coarse grasping model for each articulation sequentially from the knuckle to the tip for each finger.

15. The system according to claim 1, wherein said third neural network refines the coarse grasping model by minimizing a loss function from a distance between the hand vertices and the target object, wherein is considered that there is a contact when the distance is below to 2 mm, defined by $$L_{cont} = \frac{1}{|V_{cont}|}\sum_{v \in V_{cont}} \min_k \|v, O_k^j\|_2.$$

16. The system according to claim 1, wherein said third neural network refines the coarse grasping model by minimizing a loss function from a distance of interpenetration between a vertex of the hand model and the object, defined by $$L_{int} = \frac{1}{|V_i|}\sum_j^{|O|} \sum_{v \in V_i} \min_k \|v, O_k^j\|_2.$$

17. The system according to claim 1, wherein said third neural network refines the coarse grasping model by minimizing a loss function from a distance below a table plane, between a vertex of the hand model and the table plane, wherein the distance is favored to be positive, defined by $L_p = \Sigma_v' \min(0, |(v-p_p) \cdot v_p|)$.

18. The system according to claim 1, wherein said third neural network refines the coarse grasping model by minimizing a loss function from an adversarial loss function, using a Wasserstein loss including a gradient penalty loss, defined by $L_{adv} = -E_{H,R,T \sim p(H,R,T)}[D(G(I))] + E_{H,R,T \sim p(H,R,T)}[D(H^*, R^*, T^*)]$.

19. The system according to claim 1, wherein the hand is a human hand.

20. A method for determining parameters of a hand model suitable for grasping an object, comprising:
    (a) receiving an object segmented in an image;
    (b) predicting, with a first neural network, parameters of the hand model that define a pose for grasping the segmented object; and
    (c) refining, with a second neural network, the predicted parameters of the hand model to fit the segmented object by maximizing a number of contact points between the object in the image and the hand model while minimizing interpenetration;
    wherein the refined predicted parameters of the hand model represent how a hand may grasp the object.

21. The method according to claim 20, wherein said receiving is performed using a third neural network.

22. The method according to claim 20, wherein (b) predicts parameters of the hand model by predicting a grasp class from a set of grasp classes to obtain a set of parameters defining a coarse grasping hand model.

23. The method according to claim 20, wherein (c) refines the predicted parameters of the hand model by minimizing loss functions referring to the parameters of the hand model for obtaining an operable grasping hand model while minimizing the distance between the fingers of the hand model and the surface of the object and preventing interpenetration.

24. The method according to claim 20, further comprising:
    (d) obtaining a representation of a hand grasping the object by using the refined hand model.

25. The method according to claim 20, wherein the first neural network is a Convolutional Neural Network, with a cross entropy loss $L_{class}$ defined as:

$$L_{class} = \Sigma_{c \in K} C_{o,c} \log(1 - P_{o,c});$$

wherein C represents a grasp type for the particular object (o), c represents the grasp classes among the K possible grasps classes, and P represents pose predictions for the particular object (o).

26. The method according to claim 24, wherein the representation obtained in (d) is a mesh of the refined hand model.

27. The method according to claim 20, wherein the hand model is represented by using a MANO model, being a 51 degrees of freedom model of a possible human hand.

28. The method according to claim 20, further comprising:
    (d) evaluating the grasping hand model obtained by calculating at least one evaluating metric of an analytical grasp metric, which computes an approximation of the minimum force to be applied to break the grasp stability; an average number of contact fingers, wherein numerous contact points between hand and object favor a strong grasp; a hand-object interpenetration volume, wherein object and hand are voxelized, and the volume shared by both 3D models is computed; a simulation displacement of the object mesh subjected to gravity; and a percentage of graspable objects for which an operable grasp could be predicted, being an operable grasp the one with at least two contact points and no interpenetration.

29. The method according to claim 28, further comprising:
    (e) randomly rotating an object model;
    (f) obtaining a grasping hand model for each rotated object model;
    (g) evaluating each rotated grasping hand model using evaluating metrics; and
    (h) selecting the rotated grasping hand models having the highest score.

30. The method according to claim 21, wherein estimating a pose and shape of the object comprises an object reconstruction phase for obtaining a cloud of points representing the object form the obtained image.

31. The method according to claim 20, wherein the image comprises more than one object and the method further comprises the step of repeating (a) to (c) for each object in the image, wherein the objects are known.

32. The method according to claim 20, wherein (b) selects a grasp class by utilizing a phase of predicting an increment of translation and rotation of the hand model and a modified coarse configuration of the hand model.

33. The method according to claim 20, wherein (c) includes:
    (c1) selecting at least one articulation (i) of the hand model;
    (c2) calculating an arc (Ai) between a finger (j) of the hand model and close object vertices (O), $$D_\theta \leftarrow \min_i(\min_k(\|i A_i^\theta, O_k\|_2));$$

(c3) estimating the angle the finger needs to be rotated to collide with the object, rotating the articulation for minimizing the arc, thus, reducing the distance between the hand model and the object vertices, including a hyperparameter for controlling the interpenetration of the hand model into the object, $$\gamma_j' \leftarrow \arg\min_\theta D_\theta + \delta, \forall \theta \, s.t. \, D_\theta < t_d;$$

(c4) defining the following loss functions:

$$L_{arc} = \frac{1}{|J|} \sum_{j \in J} D_\theta^j \quad L_\gamma \leftarrow \sum_j^J \|\gamma_j' - \gamma_j\|_2;$$

and
    (c5) minimizing the loss functions defined.

34. The method according to claim 33, wherein (c) further includes (c6) repeating phases (c2) and (c3) for each articulation sequentially from the knuckle to the tip for each finger.

35. The method according to claim 20, wherein said (c) further comprises minimizing a loss function from a distance between the hand vertices and the target object, wherein is considered that there is a contact when the distance is below to 2 mm, defined by $$L_{cont} = \frac{1}{|V_{cont}|} \sum_{v \in V_{cont}} \min_k \|v, O_k^i\|_2.$$

36. The method according to claim 20, wherein said (c) further comprises minimizing a loss function from a distance of interpenetration between a vertex of the hand model and the object, defined by $$L_{int} = \frac{1}{|V_i|} \sum_j^{|O|} \sum_{v \in V_i} \min_k \|v, O_k^j\|_2.$$

37. The method according to claim 20, wherein said (c) further comprises minimizing a loss function from a distance below a table plane, between a vertex of the hand model and the table plane, wherein the distance is favored to be positive, defined by $L_p = \Sigma_v^v \min(0, |(v-p_p) \cdot v_p|)$.

38. The method according to claim 20, wherein said (c) further comprises minimizing a loss function from an adversarial loss function, using a Wasserstein loss including a gradient penalty loss, defined by $L_{adv} = -E_{H,R,T \sim p(H,R,T)}[D(G(I))] + E_{H,R,T \sim p(H,R,T)}[D(H^*, R^*, T^*)]$.

39. The method according to claim 20, wherein the hand is a human hand.

40. The method according to claim 20, wherein (a) segments an object in an image by estimating a pose and shape of the object from the image of the object.

\* \* \* \* \*